US012652716B2

(12) United States Patent
Sun

(10) Patent No.: US 12,652,716 B2
(45) Date of Patent: Jun. 9, 2026

(54) RADIO LINK MANAGEMENT TO ENABLE UNPAIRED RECEIVER PATHS OF USER EQUIPMENT

(71) Applicant: Google LLC, Mountain View, CA (US)

(72) Inventor: Ming Sun, Mountain View, CA (US)

(73) Assignee: Google LLC, Mountain View, CA (US)

( * ) Notice: Subject to any disclaimer, the term of this patent is extended or adjusted under 35 U.S.C. 154(b) by 579 days.

(21) Appl. No.: 17/997,233

(22) PCT Filed: Jul. 14, 2021

(86) PCT No.: PCT/US2021/041645
§ 371 (c)(1),
(2) Date: Oct. 26, 2022

(87) PCT Pub. No.: WO2022/020158
PCT Pub. Date: Jan. 27, 2022

(65) Prior Publication Data
US 2023/0189361 A1     Jun. 15, 2023

Related U.S. Application Data

(60) Provisional application No. 63/055,677, filed on Jul. 23, 2020.

(51) Int. Cl.
H04W 76/15       (2018.01)
H04B 7/0413       (2017.01)
(Continued)

(52) U.S. Cl.
CPC .......... H04W 76/15 (2018.02); H04B 7/0413 (2013.01); H04B 7/0632 (2013.01); H04W 8/24 (2013.01); H04W 40/248 (2013.01)

(58) Field of Classification Search
CPC ....... H04W 7/15; H04W 8/24; H04W 40/248; H04W 76/15; H04B 7/0413;
(Continued)

(56) References Cited

U.S. PATENT DOCUMENTS 8,995,358 B2    3/2015   Chen et al.
10,333,650 B2    6/2019   Chen et al.
(Continued)

FOREIGN PATENT DOCUMENTS

CN       106716908       5/2017
CN       110832789       2/2020
(Continued)

OTHER PUBLICATIONS

"Extended European Search Report", Application No. 23191032.4, Sep. 21, 2023, 9 pages.
(Continued)

*Primary Examiner* — Charles C Jiang
*Assistant Examiner* — Margaret Marie Anderson
(74) *Attorney, Agent, or Firm* — Colby Nipper PLLC

(57) ABSTRACT

The present disclosure describes various aspects of radio link management to enable unpaired receiver paths of user equipment. In some aspects, a modem of a user equipment is coupled with multiple receiver paths that include an unpaired receiver path. To enable use of the unpaired receiver path in various modes of multi-channel communication, a radio link manager of the user equipment modifies configuration information of the modem to add a nonexistent receiver path to a set of receiver path parameters for a frequency band in which the unpaired receiver path is capable of operating. Along with adding the nonexistent receiver path, the radio link manager may also modify the receiver path parameters to enable the unpaired receiver path for the frequency band. The nonexistent receiver path and unpaired receiver path are then exposed for use by the modem to implement one or more multi-channel receive modes for the frequency band.

20 Claims, 14 Drawing Sheets

(51) Int. Cl.
 *H04B 7/06* (2006.01)
 *H04W 8/24* (2009.01)
 *H04W 40/24* (2009.01)

(58) Field of Classification Search
 CPC .... H04B 7/0632; H04B 7/063; H04B 7/0628; H04B 7/0857; H04B 17/309; H04B 7/0814; H04L 5/0044; H04L 5/0091; H04L 5/0023
 See application file for complete search history.

(56) References Cited

U.S. PATENT DOCUMENTS

| | | | |
|---|---|---|---|
| 10,356,755 B2 | 7/2019 | Kumar et al. | |
| 2013/0303168 A1* | 11/2013 | Aminzadeh Gohari | ..................... H04W 72/1215 455/436 |
| 2016/0373158 A1* | 12/2016 | Ardalan | ............... H04B 7/0413 |
| 2019/0166608 A1 | 5/2019 | Kumar et al. | |
| 2019/0223033 A1 | 7/2019 | Nam et al. | |
| 2020/0112349 A1* | 4/2020 | Yang | .................... H04B 7/0404 |
| 2021/0235309 A1* | 7/2021 | Noh | ........................ H04W 8/22 |

FOREIGN PATENT DOCUMENTS

| | | |
|---|---|---|
| KR | 20200046102 A | 5/2020 |
| WO | 2022020158 | 1/2022 |

OTHER PUBLICATIONS

"Foreign Office Action", CN Application No. 202180006021.2, Jul. 28, 2023, 14 pages.

"International Preliminary Report on Patentability", Application No. PCT/US2021/041645, Jan. 24, 2023, 11 pages.

"International Search Report and Written Opinion", Application No. PCT/US2021/041645, Nov. 10, 2021, 14 pages.

Bjerke, et al., "Antenna Diversity Combining Schemes for WCDMA Systems in Fading Multipath Channels", IEEE Transactions on Wireless Communications, Feb. 2004 (Published date), Feb. 2004, 8 pages.

Sun, "User Terminal Beam Steering System", Dec. 10, 2020, 7 pages.

* cited by examiner

100

110

Radio Link Manager
170

130

131    132

140

120    141  142    120

121    123    122    124

106    107

108

101    102    105  103    104

5G Core Network
150

Access and
Mobility
Management
Function (AMF)
152

Evolved Packet
Core Network
160

Mobility and
Management
Entity (MME)
162

Figure 2:
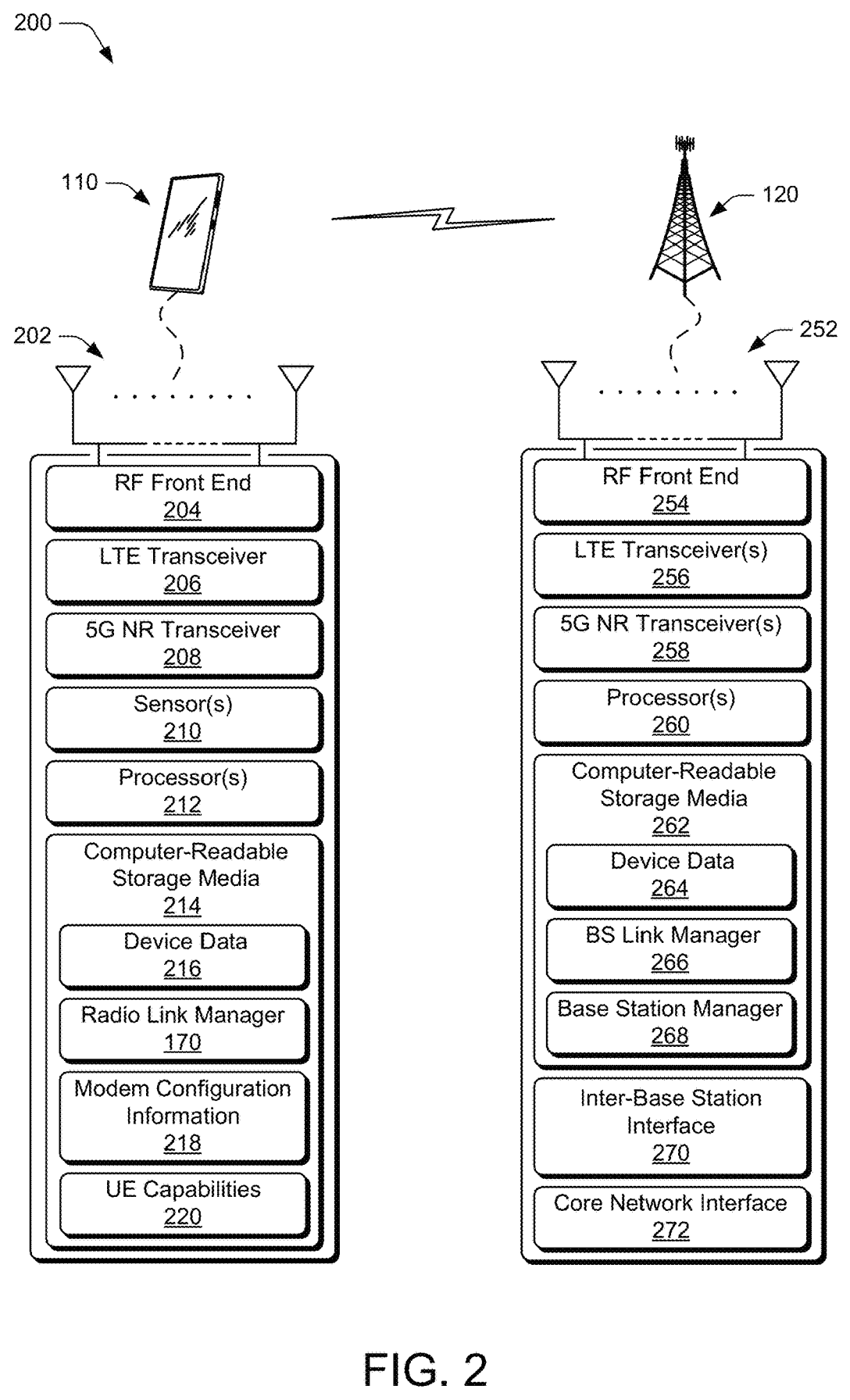

200 —

110 —

—120

202 —

— 252

| RF Front End 204 |
| LTE Transceiver 206 |
| 5G NR Transceiver 208 |
| Sensor(s) 210 |
| Processor(s) 212 |
| Computer-Readable Storage Media 214 |
| Device Data 216 |
| Radio Link Manager 170 |
| Modem Configuration Information 218 |
| UE Capabilities 220 |

| RF Front End 254 |
| LTE Transceiver(s) 256 |
| 5G NR Transceiver(s) 258 |
| Processor(s) 260 |
| Computer-Readable Storage Media 262 |
| Device Data 264 |
| BS Link Manager 266 |
| Base Station Manager 268 |
| Inter-Base Station Interface 270 |
| Core Network Interface 272 |

Antennas
202

Modem    302

Transmitter Paths
308

Transmitter(s)
304

310

Receiver Path 1
311

Receiver Path 2
312

Receiver Path 3
313

Receiver Path 4
(Dummy / Nonexistent)
314

Receiver(s)
306

RF Front End
204

Modem Configuration
Information
218

Modem Configuration
Tables
330

Radio Link
Manager
170

UE Capabilities
220

Modem Configuration Table 400

| Signal Path ID 402 | Band 404 | SDR Port Group 406 | LTE Band 408 | Type (Rx/Tx) 410 | Disabled on NA SKU 412 | Disabled on ROW SKU 414 | Disabled on JPN SKU 416 | Ant SW Path CFG 0 418 | Ant SW Path CFG 1 420 | RFC Ant Number for CFG0 422 | Transceiver RF Port 424 | MIMO LNA 1 426 | | MIMO LNA 2 428 | |
|---|---|---|---|---|---|---|---|---|---|---|---|---|---|---|---|
| | | | | | | | | | | | | Physical Path 430 | RFC Port Number 432 | Physical Path 434 | RFC Port Number 436 |
| 168 | MHB | Group A | B38 | RX2 | Yes | No | Yes | 16 | 16 | 0 | PRX2 (Grp A) | . | . | . | . |
| 169 | MHB | Group A | B38 | RX3 | Yes | No | Yes | 13 | 13 | 4 | DRX2 (Grp A) | B41 | 8 | . | . |
| 170 | UHB | Group A | B42 | RX2 | Dummy | Dummy | No | 12 | 12 | 3 | PRX10 (Grp A) | . | . | B42 | 0 |
| 171 | UHB | Group A | B42 | RX3 | No | No | No | 13 | 13 | 4 | DRX2 (Grp A) | B42/B48 | 10 | . | . |
| 172 | UHB | Group A | B48 | RX2 | Dummy | Dummy | No | 12 | 12 | 3 | PRX10 (Grp A) | . | . | B48 | 1 |
| 173 | UHB | Group A | B48 | RX3 | No | No | No | 13 | 13 | 4 | DRX2 (Grp A) | B42/B48 | 10 | . | . |
| 174 | MHB | Group B | B66 | RX2 | No | Yes | Yes | 16 | 16 | 0 | PRX5 (Grp B) | . | . | . | . |
| 175 | MHB | Group A | B66 | RX3 | No | Yes | Yes | 16 | 16 | 0 | PRX6 (Grp A) | . | . | . | . |

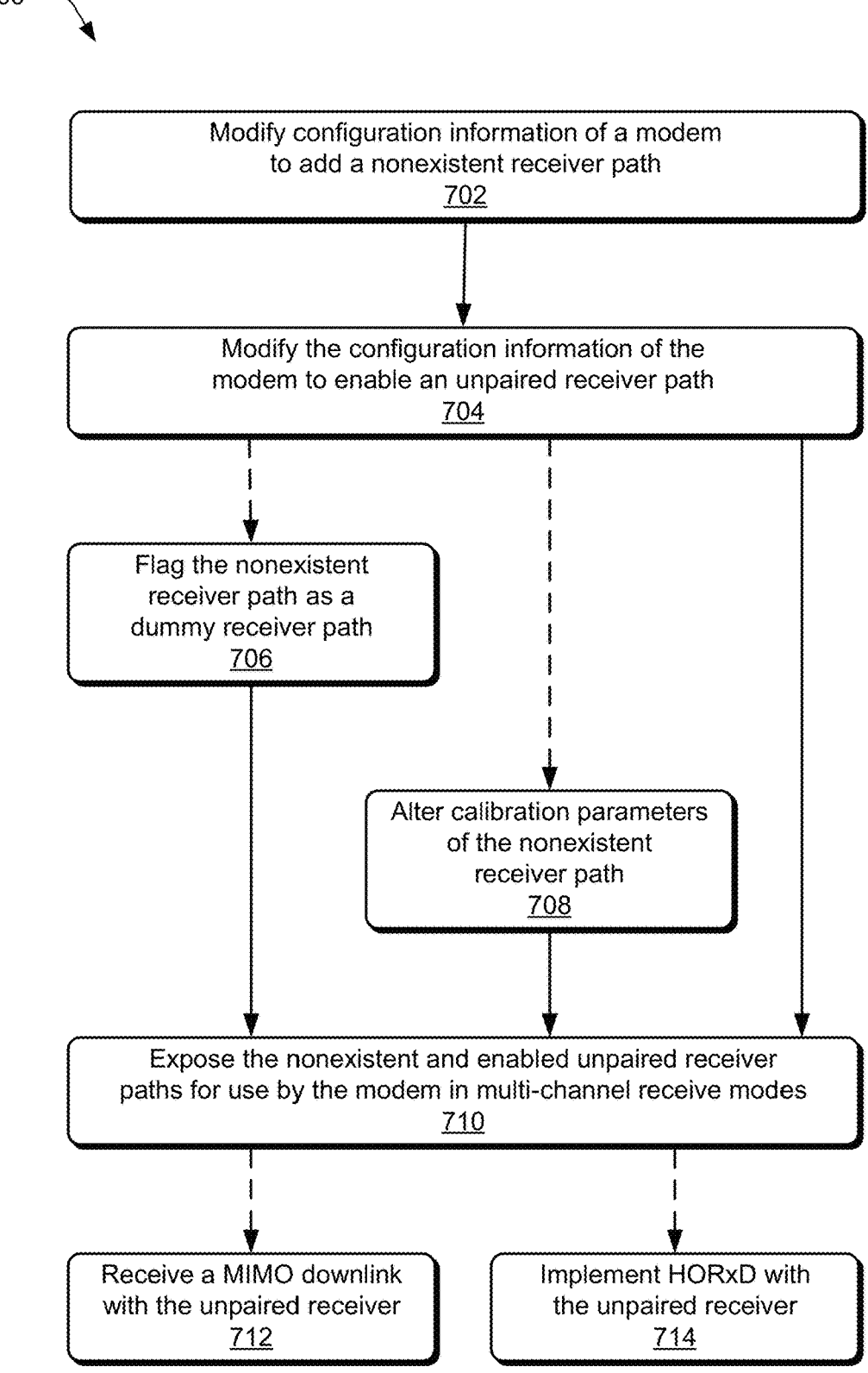

Modify configuration information of a modem
to add a nonexistent receiver path
702

Modify the configuration information of the
modem to enable an unpaired receiver path
704

Flag the nonexistent
receiver path as a
dummy receiver path
706

Alter calibration parameters
of the nonexistent
receiver path
708

Expose the nonexistent and enabled unpaired receiver
paths for use by the modem in multi-channel receive modes
710

Receive a MIMO downlink
with the unpaired receiver
712

Implement HORxD with
the unpaired receiver
714

FIG. 7

800 —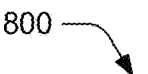

Generate user equipment (UE) capabilities based on modem
configuration information that includes parameters for an enabled
unpaired receiver path and a nonexistent receiver path
802

Transmit the UE capabilities to a base station (BS) effective to
cause the BS to enable a multi-channel downlink communication
mode to communicate with the UE via multiple channels that correspond
to at least the unpaired and nonexistent receiver paths
804

Report channel signal quality parameters for the channel that
corresponds to the nonexistent receiver path of the UE effective to cause
the BS to direct downlink data to others of the multiple channels
806

Receive, from the BS, data on the others of the
multiple channels that correspond to paired receiver
paths and the unpaired receiver path of the UE
808

FIG. 8

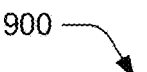

Configure a modem for multi-channel receive diversity based on
configuration information that includes parameters for a nonexistent
receiver path and an unpaired receiver path of a user equipment (UE)
902

Receive a signal transmitted by a base station via the unpaired
receiver path and other paired receiver paths of the UE
904

Omit the nonexistent receiver path
from signal receive operations of the modem
906

Combine, for the signal received, respective information from the
unpaired receiver path and the other paired receiver paths of the UE
908

Decode the signal received based on the combined information from the
unpaired receiver path and the other paired receiver paths of the UE
910

FIG. 9

1000 —
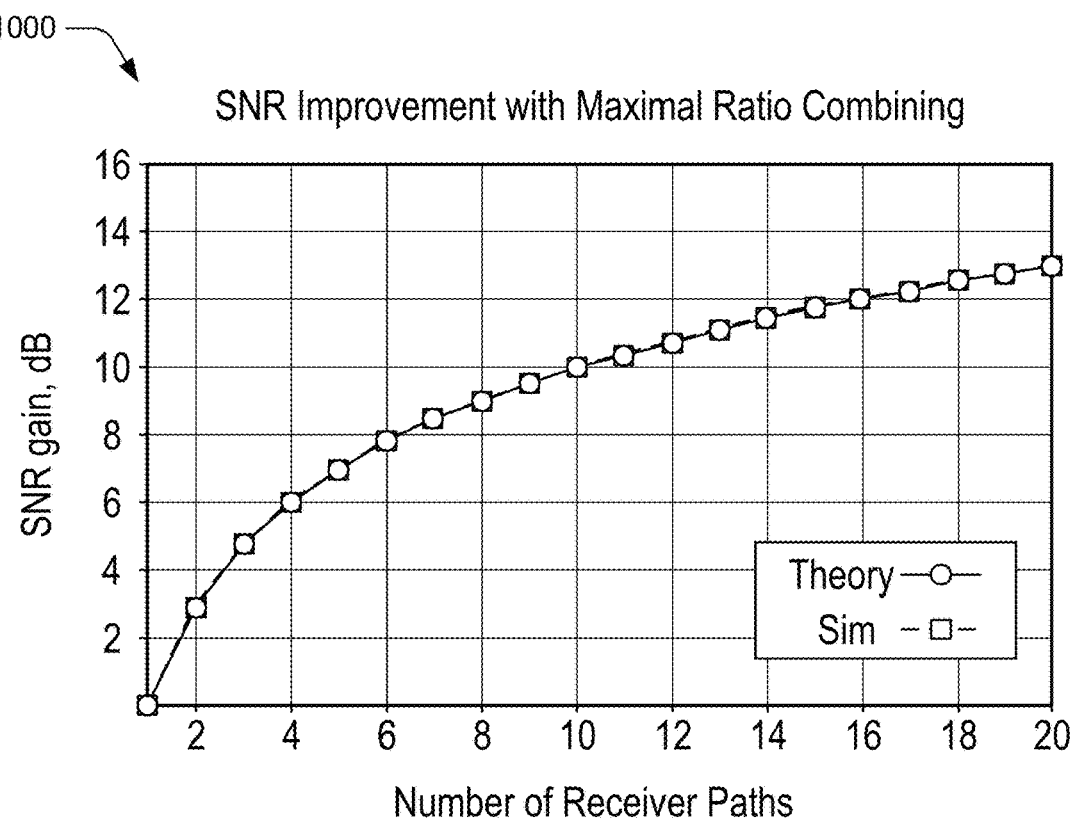
1050 —
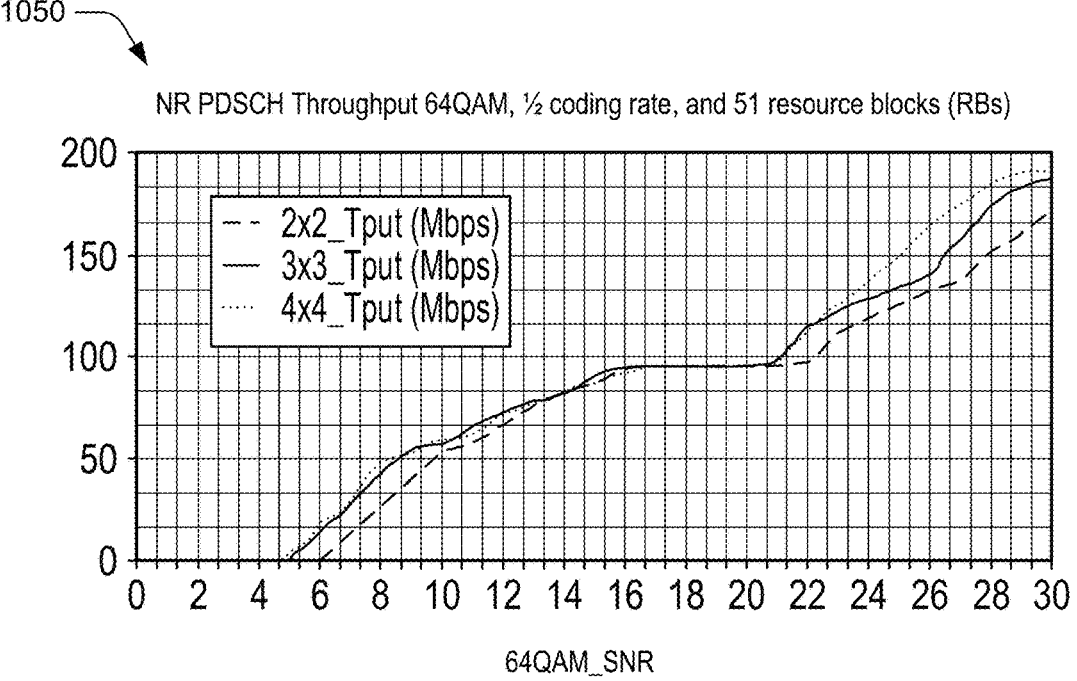
FIG. 10

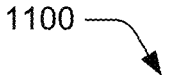
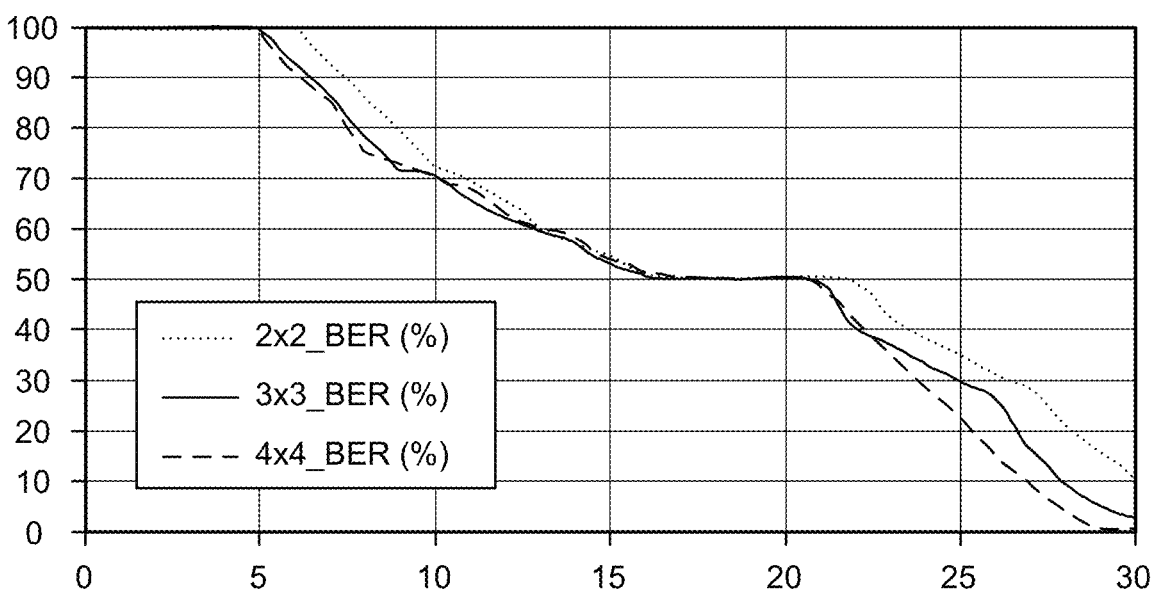
FIG. 11

RADIO LINK MANAGEMENT TO ENABLE UNPAIRED RECEIVER PATHS OF USER EQUIPMENT

RELATED APPLICATION(S)

This application is a national stage entry of International Application No. PCT/US2021/041645, filed Jul. 14, 2021, which claims the benefit of U.S. Provisional Application No. 63/055,677, filed Jul. 23, 2020, the disclosures which are incorporated herein by reference in their entirety.

BACKGROUND

Many electronic devices enable users to communicate with other devices and access resources via wireless networks. Wireless networks are typically provided through, and administered by, base stations of the wireless network. To communicate over the wireless network, a device establishes a connection with one of the base stations to receive or transmit information (e.g., control signaling or data). At a physical level, this information is communicated as signals transmitted or received through respective transmit chains or receive chains of the device. In some modes of communication, multiple receive chains are configured to concurrently receive multiple respective channels of information in a frequency band, which may increase data throughput or extend network coverage.

Frequency bands employed in various global regions, however, typically differ across each region such that designing a device to implement advanced communication schemes with every viable combination of frequency bands is cost-prohibitive. To address cost and other constraints, such as power or design space, many device designers use a regional-based approach in which some transmit and receive chains are enabled in one region and disabled in other regions where operating frequencies of the region are not supported by the transmit and receive chains. Additionally, to further reduce costs, some receive chain or transmit chain circuitry may be omitted from the device, resulting in a reduced number of receive chains or transmit chains that may not be fully utilized when implementing advanced communication schemes that require a minimum number of transmit or receive chains. As such, constraints associated with regional based design approaches often result in devices that include transmit chain or receive chain circuitry that is always disabled (e.g., when deployed to a region with non-supported frequency bands) or underutilized when implementing advanced communication schemes. Generally, this inclusion of the unused or underutilized transceiver chains increases manufacturing costs of all the multi-region devices while providing performance benefits in only a few regions where optimal use of the transceiver chains can be achieved due to compatibility between the limited transceiver chains of a device and frequency band support of the region.

SUMMARY

This disclosure describes apparatuses of and techniques for radio link management to enable unpaired receiver paths of user equipment. In some aspects, a modem of a user equipment is coupled with multiple receiver paths that include an unpaired receiver path. The unpaired receiver may be an odd numbered receiver path capable of operating in a frequency band in which pairs of other receiver paths (e.g., two, four, or six receiver paths) are configured to operate. To enable use of the unpaired receiver path in various modes of multi-channel communication, a radio link manager of the user equipment modifies configuration information of the modem to add a nonexistent receiver path to a set of receiver path parameters for a frequency band in which the unpaired receiver path is capable of operating. Along with adding the nonexistent receiver path, the radio link manager may also modify the receiver path parameters to enable the unpaired receiver path for the frequency band. The nonexistent receiver path and unpaired receiver path are then exposed for use by the modem to implement one or more multi-channel receive modes for the frequency band. By so doing, the modem may implement multiple-input multiple-output (MIMO) or high order receive diversity (HORxD) modes in which the unpaired receiver receives an additional channel of one or more signals transmitted to the user equipment from one or more base stations of a wireless network.

In some aspects, a method for radio link management to enable an unpaired receiver path of a user equipment (UE) is implemented by modifying configuration information of a modem of the UE to add a nonexistent receiver path to a set of receiver path parameters for a frequency band of the modem. The method also includes modifying the configuration of the modem of the UE to enable an unpaired receiver path in the set of receiver path parameters for the frequency band of the modem. In addition to at least one set of a paired receiver paths, the nonexistent receiver path and the unpaired receiver path are exposed in the set of receiver path parameters for use by the modem in a multi-channel receive mode for the frequency band. By so doing, the UE may manage radio links associated with the unpaired receiver path and the nonexistent receiver path to implement MIMO or HORxD modes in which the unpaired receiver functions to receive an additional channel of one or more signals transmitted to the user equipment from a base station of a wireless network.

In other aspects, a method to perform multi-channel receiving with an unpaired receiver path of a UE comprises generating user equipment capabilities (UE capabilities) based on modem configuration information for a frequency band that includes parameters that indicate the unpaired receiver path as enabled and parameters for a nonexistent receiver path. The UE transmits the UE capabilities to a base station effective to cause the base station to enable a multi-channel downlink communication mode to communicate with the UE in the frequency band via multiple channels that correspond to at least the unpaired receiver path that is enabled and the nonexistent receiver path. The method includes reporting channel signal quality parameters for the one of the multiple channels that corresponds to the nonexistent receiver path of the UE effective to cause the BS to direct at least a portion of downlink data from the channel that corresponds to the nonexistent receiver path to others of the multiple channels. The UE then receives, from the base station and in the frequency band, the downlink data on the others of the multiple channels that correspond to paired receiver paths of the UE and the unpaired receiver path of the UE.

In yet other aspects, a method to implement diversity reception with an unpaired receiver path of a UE comprises configuring a modem for multi-channel receive diversity based on modem configuration information for a frequency band that includes parameters for a nonexistent receiver path and the unpaired receiver path of the UE. The UE then receives, in the frequency band, a signal transmitted by a base station via the unpaired receiver path and other paired receiver paths of the UE. The method includes combining, for the signal received, respective information from the unpaired receiver and the other paired receiver paths of the UE to provided combined information for the signal received. The UE then decodes the signal received from the base station based on the combined information provided by the unpaired receiver path and the other paired receiver paths of the UE.

The details of one or more implementations of radio link management to enable unpaired receiver paths of a user equipment are set forth in the accompanying drawings and the following description. Other features and advantages will be apparent from the description and drawings, and from the claims. This Summary is provided to introduce subject matter that is further described in the Detailed Description and Drawings. Accordingly, this Summary should not be considered to describe essential features nor used to limit the scope of the subject matter of the appended claims.

BRIEF DESCRIPTION OF THE DRAWINGS

This disclosure describes apparatuses and techniques of radio link management to enable unpaired receiver paths of user equipment with reference to the following drawings. The use of same or similar reference numbers throughout the description and the figures may indicate like features or components:

FIG. 2 illustrates an example device diagram of network entities that can implement various aspects of radio link management to enable unpaired receiver paths;

FIG. 4 illustrates an example configuration of a modem configuration information table useful to manage receiver path parameters to enable use of unpaired receiver paths in accordance with one or more aspects;

FIG. 7 illustrates an example method for modifying configuration information of a modem to enable an unpaired receiver path in accordance with one or more aspects;

FIG. 8 illustrates an example method for managing radio links to enable use of an unpaired receiver path in receiving multi-channel downlink communications from a base station;

FIG. 9 illustrates an example method for implementing multi-channel receive diversity with an unpaired receiver path in accordance with one or more aspects;

FIG. 10 depicts example graphs of improved signal-to-noise performance and network performance of a user equipment using an unpaired receiver path in accordance with the described aspects;

FIG. 11 depicts example graphs of improved bit-error rate and throughput performance of a user equipment using an unpaired receiver path in accordance with the described aspects;

DETAILED DESCRIPTION

Figure 1:
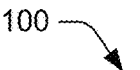
FIG. 1 illustrates an example operating environment in which various aspects of radio link management to enable unpaired receiver paths can be implemented.

Preceding techniques for designing devices with global or multi-regional communication support typically resulted in devices that were manufactured with transceiver chains that were not used or underutilized in many regions. Generally, designing a global stock keeping unit (SKU) device to support advanced implementations of carrier aggregation (CA) or multiple-input multiple-output (MIMO) in all regions is simply prohibitive from the standpoint of component cost, routing complexity, available design space, and so on. Due to these constraints, the device designers implementing the preceding techniques would split configurations for regional network support by different regional SKUs for each region or group of regions. In other words, a device with a single hardware configuration would be configured in software to implement different radio configurations based on an SKU assigned to the device for operation in a respective region.

These regional SKU-based designs, however, are still subject to various trade-offs or restrictions that limit or prevent full utilization of the radio of the device across all of the regions. For example, in many scenarios, downlink MIMO capabilities of a device (e.g., receive capabilities) can be scaled down from 4×4 MIMO to 2×2 MIMO for a particular frequency band (e.g., ultra-high band) of a regional SKU (e.g., North America) to save manufacturing costs of all device SKUs (e.g., across all regions). Oftentimes, this scaling down is achieved by removing a fourth diversity receiver module for the frequency band and associated circuitry, resulting in three receiver modules and receiver chains remaining in the hardware configuration of the device. This scaling scenario may apply to multiple regions and/or frequency bands, such as to LTE band 3 and LTE band 7 on a North America SKU, to LTE band 2, LTE band 25, and LTE band 30 on a European SKU and/or to LTE band 2, LTE band 25, and LTE band 30 on a Japan SKU.

With fewer receiver modules and receive chains, available radio path configurations of a device are often limited by standard radio configurations that support only use of even numbers of receiver paths when implementing CA and MIMO schemes. For example, when a device includes three receiver chains physically in hardware and because 3×3 MIMO or three channel receive diversity are not a standard radio configuration, the device is limited to 2×2 MIMO or receive diversity with only two receiver chains. In other words, standardized receiver configurations for implementing MIMO, CA, or HORxD select or group receiver chains in pairs or even numbers (e.g., 4×4 MIMO), such that devices are prevented from using odd numbered or unpaired receiver chains for multi-channel receiving schemes. This even number configuration issue is a common limitation of modern radio platform implementations, regardless of modem or radio manufacturer. As such, due to these limitations of radio path configurations, devices are unable to use the unpaired or odd numbered receiver paths, the inclusion of which increases device costs without offering, in many cases, any improvement in receive throughput or link margin to increase network coverage.

The present disclosure describes aspects of radio link management to enable unpaired receiver paths of user equipment. Generally, the described aspects can modify radio card or modem configuration information to add a nonexistent (e.g., dummy) receiver path to the radio card or modem. In other words, a dummy receiver path is added to the modem, which does not correspond to any physical receiver path or require calibration or validation prior to assignment to various configurations of the modem. In addition to the dummy receiver path, an unpaired or odd numbered receiver path may be enabled, such that the unpaired receiver path and dummy receiver path can be assigned as a pair of receiver paths to a frequency band group of the modem. In the context of the above example, the dummy receiver can be configured as a fourth receiver path for a user equipment that includes hardware for three receiver modules and corresponding receiver paths. Because this dummy receiver path does not exist in hardware, a user equipment (UE) may recognize this receiver path as nonexistent or non-functional when configuring the modem for or using the modem to implement multi-channel receive modes.

Accordingly, the UE may report an artificial (e.g., predefined) low channel signal quality parameter associated with this dummy receiver path back to a base station of a wireless network. Based on the low channel signal quality parameter, the base station is likely to disregard this channel (e.g., a fourth channel) and enable actual 3×3 MIMO with the UE, which is a non-standard radio link configuration. By using the dummy receiver path to cause the base station to enable 3×3 MIMO instead of 2×2 MIMO, the UE may achieve an additional fifty percent (50%) in receive throughput under optimal network conditions. The UE may also use the dummy receiver path when configuring the modem for high order receive diversity (HORxD), in which the Maximal Ratio Combining (MRC) algorithm implemented by the modem can disregard a channel that corresponds to the fourth (dummy) receiver path due to poor channel signal quality, which may include predefined low values. By using the three receiver paths instead of two receiver paths as previously limited, the UE may achieve an additional twenty percent in network coverage due to an approximate increase 1.6 decibels (dB) in signal-to-noise ratio (SNR) with the three receiver modules. These are but a few examples of the ways in which radio link management to enable unpaired receiver paths of user equipment can be implemented to improve UE receive performance.

In various aspects, a modem of a user equipment is coupled with multiple receiver paths that include an unpaired receiver path. The unpaired receiver may be an odd numbered receiver path capable of operating in a frequency band in which pairs of other receiver paths (e.g., two, four, six receiver paths) are configured to operate. To enable use of the unpaired receiver path in various modes of multichannel communication, a radio link manager of the user equipment modifies configuration information of the modem to add a nonexistent receiver path to a set of receiver path parameters for a frequency band in which the unpaired receiver path is capable of operating. Along with adding the nonexistent receiver path, the radio link manager may also modify the receiver path parameters to enable the unpaired receiver path for the frequency band. The nonexistent receiver path and unpaired receiver path are then exposed for use by the modem to implement one or more multichannel receive modes for the frequency band. By so doing, the modem may implement multiple-input multiple-output (MIMO) or high order receive diversity (HORxD) modes in which the unpaired receiver receives an additional channel of one or more signals transmitted to the user equipment from one or more base stations of a wireless network.

The following discussion describes an operating environment, techniques that may be employed in the operating environment, and various devices or systems in which components of the operating environment can be embodied. In the context of the present disclosure, reference is made to the operating environment by way of example only.

Example Environment

FIG. 1 illustrates an example operating environment 100 in which various aspects of radio link management to enable unpaired receiver paths of user equipment can be implemented. Generally, the example environment 100 includes a user equipment 110 (UE 110), which can communicate with base stations 120 (illustrated as base stations 121, 122, 123, and 124) through wireless communication links or radio links 130 (radio link 130), illustrated as radio link 131 and radio link 132. For simplicity, the UE 110 is implemented as a smart-phone but may be implemented as any suitable computing or electronic device, such as a smart watch, mobile communication device, modem, cellular phone, gaming device, navigation device, media device, laptop computer, desktop computer, tablet computer, smart appliance, vehicle-based communication system, an Internet-of-things (IoT) device (e.g., sensor node, controller/actuator node, combination thereof), and the like. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, or the like, or any combination thereof.

The base stations 120 communicate with the UE 110 through the radio links 131 and 132 (e.g., wireless links or wireless channels), which may be implemented as any suitable type of radio link. The radio links 131 and 132 include control and data communication, such as downlink of data and control information communicated from the base stations 120 to the UE 110, uplink of other data and control information communicated from the UE 110 to the base stations 120, or both. The radio links 130 may include one or more radio links (e.g., radio links) or bearers implemented using any suitable communication protocol or standard, or combination of communication protocols or standards, such as 3rd Generation Partnership Project Long-Term Evolution (3GPP LTE), LTE-Advanced, Fifth Generation New Radio (5G NR), and so forth. Multiple radio links 130 may be aggregated in a carrier aggregation (CA) to provide a higher data rate for the UE 110. Multiple radio links 130 from multiple base stations 120 may be configured for Coordinated Multipoint (CoMP) communication with the UE 110. Additionally, multiple radio links 130 may be configured for dual connectivity (DC) (e.g., dual carrier or multi-carrier), single-RAT dual connectivity (SR-DC), or multi-RAT dual connectivity (MR-DC).

The base stations 120 collectively form a Radio Access Network 140 (e.g., RAN, Evolved Universal Terrestrial Radio Access Network, E-UTRAN, 5G NR RAN or NR RAN). The RANs 140 are illustrated as an NR RAN 141 and an E-UTRAN 142. The base stations 121 and 123 in the NR RAN 141 are connected to a Fifth Generation Core 150 (5GC 150) network. The base stations 122 and 124 in the E-UTRAN 142 connect to an Evolved Packet Core 160

(EPC 160). Alternatively or additionally, the base station 122 may connect to both the 5GC 150 and EPC 160 networks.

The base stations 121 and 123 connect, at 101 and 102 respectively, to the 5GC 150 through an NG2 interface for control-plane signaling and using an NG3 interface for user-plane data communications. The base stations 122 and 124 connect, at 103 and 104 respectively, to the EPC 160 using an S1 interface for control-plane signaling and user-plane data communications. Optionally or additionally, if the base station 122 connects to the 5GC 150 and EPC 160 networks, the base station 122 connects to the 5GC 150 using an NG2 interface for control-plane signaling and through an NG3 interface for user-plane data communications, at 105.

In addition to connections to core networks, the base stations 120 may communicate with each other. For example, the base stations 121 and 123 communicate through an Xn interface at 106 and the base stations 122 and 124 communicate through an X2 interface at 107 to exchange user-plane and control-plane data. The interface or link at 105 or 106 between the base stations 120 can be implemented as any suitable type of link, such as a mmWave link, a sub-mmWave link, or a free-space optical (FSO) link. At least one base station 120 (base station 121 and/or base station 123) in the NR RAN 141 can communicate with at least one base station 120 (base station 122 and/or base station 124) in the E-UTRAN 142 using an Xn interface 107. In aspects, base stations 120 in different RANs (e.g., base stations 120 of each RAN) communicate with one another using an Xn interface such as Xn interface 108.

The 5GC 150 includes an Access and Mobility Management Function 152 (AMF 152), which provides control-plane functions, such as registration and authentication of multiple UE 110, authorization, and mobility management in the 5G NR network. The EPC 160 includes a Mobility Management Entity 162 (MME 162), which provides control-plane functions, such as registration and authentication of multiple UE 110, authorization, or mobility management in the E-UTRA network. The AMF 152 and the MME 162 communicate with the base stations 120 in the RANs 140 and also communicate with multiple UE 110, using the base stations 120.

With reference to FIG. 1, the UE 110 also includes a radio link manager 170 in accordance with one or more aspects. In some aspects, the radio link manager 170 modifies configuration information of a modem of the UE 110 to add a nonexistent receiver path (e.g., dummy receiver path) to a set of receiver path parameters for a frequency band in which an unpaired receiver path of the modem is capable of operating. Along with adding the nonexistent receiver path, the radio link manager 170 may also modify the receiver path parameters to enable the unpaired receiver path for the frequency band. The nonexistent receiver path and unpaired receiver path are then exposed for use by the modem to implement one or more multi-channel receive modes for the frequency band. By so doing, the modem may implement multiple-input multiple-output (MIMO) or high order receive diversity (HORxD) modes in which the unpaired receiver receives an additional channel of one or more signals transmitted to the user equipment from one or more base stations of a wireless network. In various aspects, the radio link manager 170 may also alter or modify UE capabilities, channel signal measurements, and/or calibration information associated with the nonexistent receiver path to enable the UE 110 to implement MIMO or HORxD with the unpaired receiver. The uses and implementations of the radio link manager 170 may vary in accordance with one or more aspects and are described throughout the disclosure.
Example Devices FIG. 2 illustrates an example device diagram 200 of a user equipment and a service cell base station. Generally, the device diagram 200 describes network entities that can implement various aspects of radio link management to enable unpaired receiver paths. FIG. 2 shows respective instances of the UE 110 and the base stations 120. The UE 110 and the base stations 120 may include additional functions and interfaces that are omitted from FIG. 2 for the sake visual brevity. The UE 110 includes antennas 202, a radio frequency front end 204 (RF front end 204), and radio-frequency transceivers (e.g., an LTE transceiver 206 and a 5G NR transceiver 208) for communicating with base stations 120 in the NR RAN 141 and/or the E-UTRAN 142. The UE 110 may also include one or more additional transceivers (e.g., local wireless network transceiver) for communicating over one or more local wireless networks (e.g., WLAN, WPAN, Bluetooth™, NFC, Wi-Fi-Direct, IEEE 802.15.4, ZigBee, Thread, mmWave, sub-mmWave, FSO, radar, lidar, sonar, ultrasonic) with another UE or local network entities. The RF front end 204 of the UE 110 can couple or connect the LTE transceiver 206, the 5G NR transceiver 208, and the other transceivers (not shown) of the UE 110 to the antennas 202 to facilitate various types of wireless communication.

The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards (e.g., 57-64 GHz, 28 GHz, 38 GHz, 71 GHz, 81 GHz, or 92 GHz bands). In addition, the RF front end 204 can be tuned to, and/or be tunable to, one or more frequency bands defined and implemented by the local wireless network transceivers of the UE 110 to support transmission and reception of communications with other UEs or entities associated with a local wireless network.

The UE 110 includes sensor(s) 210, which can be implemented to detect various properties such as temperature, location, orientation, supplied power, power usage, battery state, or the like. As such, the sensors 210 may include any one or a combination of temperature sensors, global navigational satellite system (GNSS) sensors, accelerometers, thermistors, battery sensors, and power usage sensors.

The UE 110 also includes processor(s) 212 and computer-readable storage media 214 (CRM 214). The processor 212 may be a single core processor or a multiple core processor implemented with a homogenous or heterogenous core structure. The processor 212 may include a hardware-based processor implemented as hardware-based logic, circuitry, processing cores, or the like. In some aspects, functionalities of the processor 212 and other components of the UE 110 are provided via an integrated processing, communication, and/or control system (e.g., system-on-chip), which may enable various operations of a UE 110 in which the system is embodied. The computer-readable storage media described herein excludes propagating signals. The CRM 214 may include any suitable memory or storage device such as random-access memory (RAM), static RAM (SRAM), dynamic RAM (DRAM), non-volatile RAM (NVRAM), read-only memory (ROM), or Flash memory useable to store device data 216 of the UE 110. The device data 216 includes user data, multimedia data, beamforming codebooks, applications, and/or an operating system of the UE 110, which are executable by processor(s) 212 to enable user-plane communication, control-plane signaling, and user interaction with the UE 110.

In aspects of radio link management, the CRM 214 of the UE 110 may also include an instance of the radio link manager 170, modem configuration information 218, and UE capabilities 220. The modem configuration information 218 as described herein may also include or refer to configuration information for a radio module or radio card of the UE 110. Alternatively or additionally, the radio link manager 170 may be implemented in whole or part as hardware logic or circuitry integrated with or separate from other components of the UE 110. Generally, the radio link manager 170 of the UE 110 can create, edit, or modify the modem configuration information 218 to enable use of unpaired receiver paths of the UE 110. To do so, the radio link manager 170 modifies the modem configuration information 218 to add a nonexistent receiver path (e.g., dummy receiver path) to a set of receiver path parameters for a frequency band in which an unpaired receiver path (e.g., odd numbered receiver path) of the UE 110 is capable of operating. Along with adding the nonexistent receiver path, the radio link manager 170 may also modify the receiver path parameters of the modem configuration information 218 to enable the unpaired receiver path (e.g., a third or fifth receiver path) in one or more frequency bands. In some aspects, the radio link manager 170 exposes the nonexistent receiver path and unpaired receiver path for use by the UE 110 to implement one or more multi-channel receive modes for the frequency band. Alternatively or additionally, the radio link manager 170 may edit or modify the UE capabilities 220 to indicate to a base station 120 that the UE 110 supports, via the unpaired receiver path and the nonexistent receiver path, MIMO or HORxD modes in which the unpaired receiver receives an additional channel of one or more signals transmitted to the user equipment from one or more base stations of a wireless network. The radio link manager 170 may also generate or modify channel signal quality parameters that are sent to a base station 120 to cause the base station to implement non-standard configurations of MIMO communication, such as 3×3 MIMO, 5×5 MIMO, or the like. The implementations and uses of the radio link manager 170 of the UE 110 vary and are described throughout the disclosure.

Aspects and functionalities of the UE 110 may be managed by operating system controls presented through an application programming interface (API). In some aspects, the radio link manager 170 accesses an API or an API service of the UE 110 to control aspects and functionalities of the user equipment or transceivers thereof. For example, the radio link manager 170 can access or utilize the LTE transceiver 206 or 5G NR transceiver 208 to modify transceiver (e.g., modem or radio) configuration information, calibration information, signal quality measurement, or the like. The CRM 214 also includes a communication manager (not shown). The communication manager may also be implemented in whole or part as hardware logic or circuitry integrated with or separate from other components of the UE

110. In at least some aspects, the communication manager configures the RF front end 204, the LTE transceiver 206, the 5G NR transceiver 208, and/or other transceivers of the UE 110 to implement the techniques of radio link management to enable unpaired receiver paths as described herein.

As shown in FIG. 2, the device diagram for the base stations 120 includes a single network node (e.g., a gNode B or eNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency bands defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with any UE 110 in a UE-coordination set.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as RAM, SRAM, DRAM, NVRAM, ROM, or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the UEs 110 operating on one or more RANs 140 provided via the base station 120.

In aspects, the CRM 262 of the base station 120 also includes a base station radio link manager 266 (BS link manager 266). Alternatively or additionally, the BS link manager 266 may be implemented in whole or part as hardware logic or circuitry integrated with or separate from other components of the base station 120. Generally, the BS link manager 266 enables the base station 120 to communicate with the UE 110 via non-standard channel or carrier configurations, which may include non-standard MIMO configurations by which data is transmitted to the UE 110. For example, in response to an indication or modified signal quality parameters for a channel provided by the radio link manager 170, the BS link manager 266 may implement a MIMO configuration without that channel. In some cases, the BS link manager 266 causes, in response to the modified signal quality parameters, the base station 120 to effectively implement 3×3 MIMO, 5×5 MIMO, or 7×7 MIMO transmissions to the UE 110.

CRM 262 also includes a base station manager 268. Alternatively or additionally, the base station manager 268 may be implemented in whole or part as hardware logic or circuitry integrated with or separate from other components of the base stations 120. In at least some aspects, the base station manager 268 configures the LTE transceivers 256 and the 5G NR transceivers 258 for communication with the UE 110, as well as communication with a core network. The base stations 120 include an inter-base station interface 270, such as an Xn and/or X2 interface, which the base station manager 268 configures to exchange user-plane and control-plane data between another base station 120, to manage the communication of the base stations 120 with the UE 110. The base stations 120 include a core network interface 272 that the base station manager 268 configures to exchange user-plane and control-plane data with core network functions and/or entities.

Figure 3:
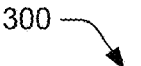
FIG. 3 illustrates an example configuration of components for implementing radio link management to enable unpaired receiver paths in accordance with one or more aspects.

FIG. 3 illustrates at 300 an example configuration of components for implementing various aspects of radio link management to enable unpaired receiver paths of user equipment. The illustrated components may be implemented in any suitable device, system, or apparatus, such as a user equipment, a user device, a mobile device, a mobile station, or the like. The components and architecture of the example configuration are presented as a non-limiting example of ways in which various entities for enabling radio link management to enable unpaired receiver paths of user equipment can be implemented. As such, the aspects described herein may be applied or extended to any suitable combination or configuration of components and/or circuitry for implementing various features of radio link management to enable unpaired receiver paths.

In this example, the components are illustrated in the context of a UE 110, which may be implemented as described with reference to FIG. 2. Generally, the UE 110 includes a modem 302 that provides a wireless communication interface by which the UE 110 communicates user-plane and/or control-plane information with base stations 120 of a wireless network. The modem 302 can be implemented as or part of a radio card, radio module, modem baseband processor, wireless communication processor, system-on-chip, LTE transceiver, or 5G NR transceiver, such as any of those described herein. To facilitate wireless communication, the modem 302 implements various data- and signal-processing functions, which may include encoding, decoding, modulation, demodulation, analog-to-digital conversion, digital-to-analog conversion, or the like. In some cases, the modem 302 is configured as a multi-mode multi-band modem through which a transceiver is embodied at least in part for wireless communication using multiple radio access technologies (RATs) (e.g., LTE, 5G NR) in multiple frequency bands.

The modem 302 includes transmitter(s) 304 and receiver(s) 306 to communicate in one or more RATs and/or one or more frequency bands. Transmitter paths 308, which may also be referred to as transmitter chains, operably couple the transmitter 304 of the modem 302 to the RF front end 204 and/or antennas 202 of the UE 110. The transmitter paths 308 include respective instances of transmitter components, functionality, and circuitry (not shown) that provide a path or chain by the modem 302, which transmits user and/or control information via a channel or carrier signal through a wireless medium. For example, an instance of a transmitter path 308 may include a set of transmitter components and circuitry that encode, modulate, up-convert, amplify, route, and transmit an individual or separate stream or channel of UE data. As such, the transmitter path 308 may include a transmitter module or section of the modem 302, digital-to-analog conversion circuitry, RF transceiver circuitry, RF switches and diplexers of the RF front end 204, and one of the antennas 202. To implement dual connectivity or MIMO transmission modes, the transmitter 304 may configure and use any suitable number of transmitter paths 308 implemented between the modem 302 and antennas 202 to transmit data and control information via multiple channels (e.g., MIMO) or radio links (dual connectivity).

Receiver paths 310, which may also be referred to as receiver chains, operably couple the receiver 306 of the modem 302 to the RF front end 204 and/or antennas 202 of the UE 110. In this example, the receiver paths 310 of the modem 302 include three receiver paths 311 through 313 (e.g., operational or functional receiver chains) and a fourth dummy or nonexistent receiver path 4 (dummy receiver path 314) that does not correspond to any physical receiver path functionality or hardware. Although illustrated with three actual or physical receiver paths 310, the modem 302 may include any number of receiver paths configurable to operate in a frequency band or frequency band group (e.g., LTE frequency bands). In some aspects, the modem 302 includes an odd number (e.g., three, five, seven, and so on) of functional or operational receiver paths for one or more frequency bands. These operational receiver paths may include one or more pairs of operational receiver paths and an unpaired or odd numbered operational receiver path. In this example, the three receiver paths 311 through 313 include a paired set of the receiver paths 311 and 312, and an unpaired or odd numbered receiver path 313. In aspects, the third receiver path 313 may be enabled and/or paired along with the dummy receiver path 314 to enable the UE 110 to implement MIMO, CA, or HORxD with the third receiver path 313. In such cases, the UE 110 may effectively implement 3×3 MIMO reception or three channel HORxD with the three receiver paths 310, with the dummy receiver path 314 being disregarded or ignored by the UE 110 and/or base station 120 during receive operations.

Although not shown, the receiver paths 310 may each include respective instances of receiver components, functionality, and circuitry that provide a path or chain by the modem 302, that receives user and/or control information via a channel or carrier signal through a wireless medium. As noted, the dummy receiver path 314 may be implemented by the radio link manager 170 and does not correspond to an actual receiver path. As such, the dummy receiver path 314 may lack one or more software, firmware, or hardware components that the other receiver paths include to provide a path between the modem 302 and antennas 202 for receiving signals and data. The receiver paths 310, other than the dummy receiver path 314, may each include a set of receiver components and circuitry that decode, demodulate, down-convert, amplify, filter, route, and receive an individual or separate stream or channel of UE data. As such, the receiver paths 310 may include a receiver module or section of the modem 302, analog-to-digital conversion circuitry, RF transceiver circuitry, RF switches and diplexers of the RF front end 204, and one of the antennas 202. To implement dual connectivity or MIMO reception modes, the receiver 306 may configure and use any suitable number of receiver paths 310 implemented between the modem 302 and antennas 202 to receive data and/or control via multiple channels (e.g., MIMO) or radio links (dual connectivity).

As shown in FIG. 3, the modem 302 includes various components for enabling and using unpaired receiver paths in accordance with one or more aspects. In this example, the modem 302 includes an instance of modem configuration information 218 having one or more modem configuration tables 330. In aspects, the radio link manager 170 interacts with or modifies the modem configuration information 218 and/or the modem configuration tables 330 to add nonexistent receiver paths and/or to enable unpaired receiver paths for use by the modem 302. Generally, the modem configuration tables 330 include information describing signal paths that are useful for the modem 302 to transmit and receive communications (e.g., signals and/or data) via the antennas 202. Information for a given transmit or receive signal path may include parameters relating to frequency bands, regional SKUs, transceiver ports, switch configurations, component paths, physical paths, and so on.

By way of example, consider FIG. 4 in which an example Modem Configuration Information Table 400 (Table 400) is illustrated. In aspects, the Table 400 or similar implementations of a modem configuration information (e.g., lookup tables) are useful to manage receiver path parameters to enable use of unpaired receiver paths in accordance with one or more aspects. Generally, the receiver path parameters of the Table 400 describe or specify various settings or configurations of the receiver paths 310 of the modem 302. For example, the Table 400 may identify a receiver path as a signal path implemented by the modem 302 and receiver paths 310 based on a set of parameters or configurations for various software and hardware components of the modem 302, RF front end 204, and other transceiver elements. In aspects, the radio link manager 170 adds, modifies, or edits information in the Table 400 to add nonexistent receiver paths, enable unpaired or odd numbered receiver paths, and expose these receiver paths for multi-channel or multi-carrier receiving operations.

The Table 400 may include any suitable number or type of parameters that specify a receiver path for the modem 302. As shown in FIG. 4, the Table 400 includes settings columns for a signal path identifier (ID) 402, a frequency band ranges (band) 404, software defined radio (SDR) port group 406, LTE band 408, and receive/transmit (Rx/Tx) type 410. To indicate regional support, the Table 400 includes disable indicators for a North American SKU 412, Rest of World SKU 414, and Japanese SKU 416. Generally, these settings indicate whether a receive path is available for use in one or more of the regions as specified by columns 412 though 414. The Table 400 also includes antenna switch path configurations (Ant SW Path CFG) 418 and 420, and an RF configuration (RFC) antenna number (Ant Number) 422 for a respective RF switch path configuration (CFG 0). For a given signal path 402, the Table 400 indicates a transceiver RF port 424 and MIMO low-noise amplifier (LNA) settings 426 and 428. For a first MIMO LNA 426, the Table 400 includes a physical path 430 and RFC port number 432, and for a second MIMO LNA 428, a physical path 434 and RFC port number 436. With the exception of the values shown at 440, the fields of the Table 400 may be configured or set (e.g., programmed) by a modem manufacturer or user equipment manufacturer.

In aspects, the radio link manager 170 may edit or modify values shown at 440 from "Yes" (not shown), under Disabled on North America 412 and Rest of World 414, to "Dummy" and "No" to add respective dummy receiver paths (or chains) and enable respective unpaired (e.g., third) signal paths for the SKUs in one or more frequency bands. In the context of the present example, the radio link manager 170 adds a dummy receiver path, as signal path 170, for LTE band B42 on the North American SKU 412 by changing "Yes" to "Dummy" and enables a third (unpaired) receiver path by changing "Yes" to "No", indicating this signal path is enabled for North America in the indicated frequency band. As shown at 440 (in bolded values), the radio link manager 170 may perform similar modifications for signal paths 171, 172, and 173 of the Table 400 to add dummy receiver paths (e.g., "Yes"→"Dummy") and enable unpaired receiver paths (e.g., "Yes"→"No") for LTE band B48 on the North American SKU 412, and for LTE bands B42 and B48 on the Rest of World SKU 414.

Alternatively or additionally, the radio link manager 170 can modify calibration information or other receive path parameters (e.g., gain settings, not shown) to indicate (e.g., flag) the signal paths 170 and 172 as "dummy" receiver paths, which are nonexistent and do not correspond to one of the physical receiver paths 310 of the modem 302. With respect to adding or indicating the nonexistent receiver paths in the Table 400, the radio link manager 170 may also selectively alter a Boolean data value (e.g., "Yes/No") as shown in FIG. 4 with a non-Boolean value (e.g., "Dummy") to flag a dummy receiver path. By so doing, the modem 302 or lower levels of a modem software stack (e.g., L1 layer) may identify a nonexistent receiver path and, in response, report artificial channel measurements to the network in order to implement MIMO or CA with an odd number of receiver paths.

Returning to FIG. 3, the radio link manager 170 may expose or cause the modem 302 to use the enabled unpaired third receiver path 313 and the dummy receiver path 314. In some cases, the radio link manager 170 indicates that the unpaired third receiver path 313 and the dummy receiver path 314 are available to the modem 302 as an additional pair of receiver paths for use in one or more frequency bands. In other words, the modem 302 may be capable of implementing higher order MIMO or HORxD schemes by including the unpaired third receiver path 313 and the dummy receiver path 314 in a receive mode configuration (e.g., MIMO or HORxD) as another paired set of receiver paths. In some aspects, the radio link manager 170 modifies the UE capabilities to indicate, to the network, that the UE 110 is capable of implementing multi-channel reception (e.g., 4×4 MIMO) via an even number of receiver paths 310 that include the unpaired third receiver path 313 and the dummy receiver path 314.

In some aspects, the radio link manager 170 alters network feedback to cause the network to effectively implement multi-channel downlink transmissions to the UE 110 with an odd number of channels that correspond to paired operational receiver paths 310 (e.g., 311 and 312) and an unpaired or odd numbered receiver path (e.g., 313) of the UE 110. For example, the radio link manager 170 may cause the UE 110 to report an artificial (e.g., predefined) low channel signal quality parameter associated with the dummy receiver path (e.g., 314) back to a base station 120 of a wireless network. Based on the low channel signal quality parameter, the base station 120 is likely to disregard this channel (e.g., a fourth channel) and enable actual 3×3 MIMO with UE 110, which is a non-standard radio link configuration. By using the dummy receiver path to cause the base station 120 to enable 3×3 MIMO instead of 2×2 MIMO, the UE 110 may achieve an additional fifty percent (50%) in receive throughput under optimal network conditions.

The radio link manager 170 may also direct the UE 110 to use the dummy receiver path as a basis for configuring the modem for HORxD, in which the MRC algorithm implemented by the modem 302 can disregard a channel that corresponds to the fourth (dummy) receiver path 314. In some cases, the modem 302 disregards the channel of the dummy receiver path due to poor channel signal quality (e.g., artificial values) or an indication that the receiver path is flagged as a dummy receiver path. By using the three receiver paths instead of two receiver paths, the UE may achieve an additional twenty percent (20%) in network coverage due to an approximate increase of 1.6 dB in SNR with the three receiver modules.

Example Communication Operations with Dummy Receiver Paths

Figure 5:
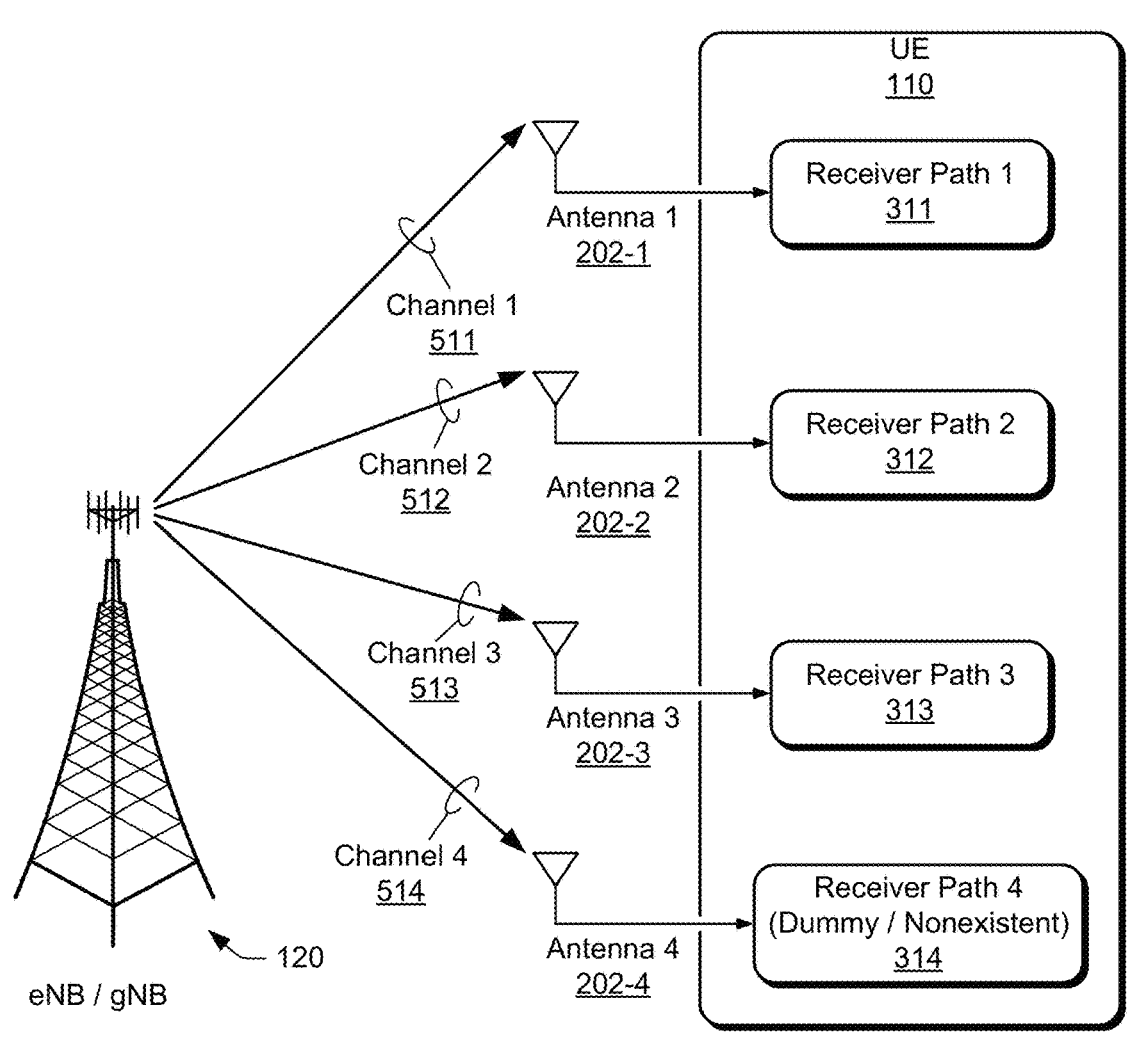
FIG. 5 illustrates an example of a user equipment implementing single carrier multiple-input multiple-output (MIMO) communication with an unpaired receiver path in accordance with one or more aspects.

FIG. 5 illustrates an example 500 of a user equipment implementing single carrier multiple-input multiple-output (MIMO) communication with an unpaired receiver path in accordance with one or more aspects. Although described in the context of MIMO reception, the communications shown in FIG. 5 may also apply to implementations of HORxD in which channels are referenced to a respective receive channel experienced by each receiver path (e.g., receiver paths 310) of the UE 110 for one transmitter (or downlink signal) of the base station 120.

In aspects, the UE 110 provides to the base station 120 an indication that the UE 110 is capable of implementing 4×4 MIMO reception. Based on the indication, the base station 120 transmits four separate downlink channels 511-514 (channels 1-4) of signaling and/or information to the UE 110. In this example, the UE 110 receives first downlink channel 511 (e.g., channel 1) via antenna 202-1 and first receiver path 311, second downlink channel 512 (e.g., channel 2) via antenna 202-2 and second receiver path 312, and third downlink channel 513 (e.g., channel 3) via antenna 202-3 and third receiver path 313. Because the fourth (dummy) receiver path 314 and antenna 202-4 do not correspond to a physical receiver path or chain, the UE 110 disregards or ignores the fourth downlink channel 514 (e.g., channel 4). In some aspects, the UE 110 reports signal quality parameters (e.g., predefined or artificial measurements) for the fourth downlink channel 514 effective to cause the base station 120 to direct or redistribute downlink data associated with the fourth downlink channel 514 to others of the downlink channels (e.g., first downlink channel 511, second downlink channel 512, third downlink channel 513). As such, the UE 110 may use the enabled third receiver path 313 and the dummy receiver path 314 to effectively implement 3×3 MIMO by causing the base station 120 to configure for and initiate downlink 4×4 MIMO. By so doing, the UE 110 may achieve improved receive performance, such as an increase of approximately fifty percent (50%) in throughput when implementing downlink 3×3 MIMO instead of 2×2 MIMO.

Figure 6:
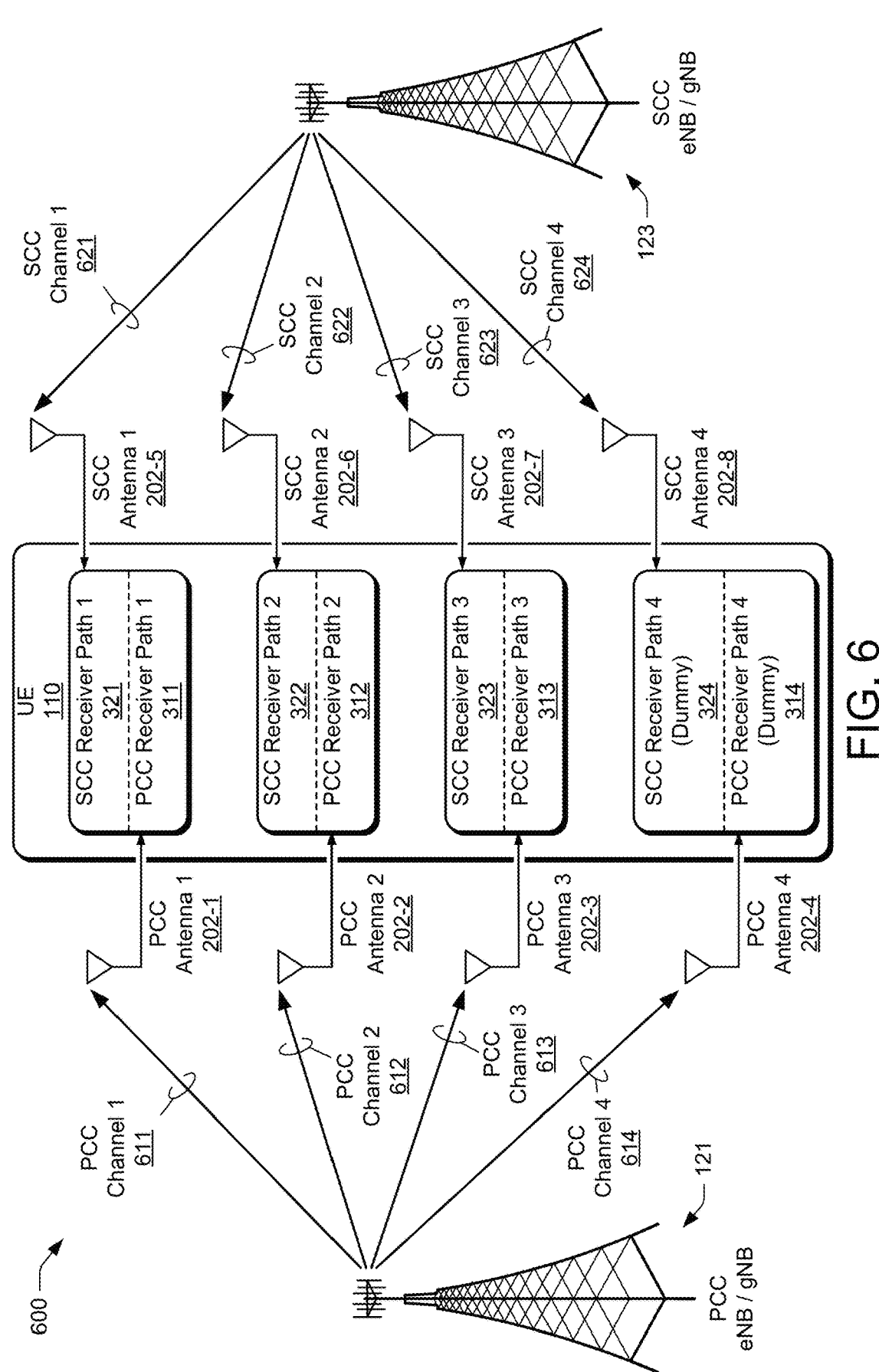
FIG. 6 illustrates an example of a user equipment implementing dual-carrier MIMO communication with unpaired receiver paths in accordance with one or more aspects.

FIG. 6 illustrates an example 600 of a user equipment implementing dual-carrier MIMO communication with unpaired receiver paths in accordance with one or more aspects. Although described in the context of MIMO reception, the communications shown in FIG. 6 may also apply to HORxD in which channels are referenced to a respective receive channel experienced by each receiver path 310 of the UE 110 for one transmitter (or downlink signal) of one of the base stations 120.

In aspects, management of radio links can be scaled for multi-carrier aggregation scenarios to improve the receive performance of the UE 110. As shown in FIG. 6, the UE 110 can use multiple carriers (e.g., LTE carriers) simultaneously in various carrier aggregation (CA) configurations. In some cases, the UE 110 provides a UE capabilities 220 message to the base stations 120 that facilitate the establishment of a primary component carrier (PCC) for CA, which is complemented with one or several secondary component carriers (SCC). Generally, the PCC handles control signaling while one or more SCCs enable increased data throughput. The UE 110 and base stations 120 can implement the carriers as frequency division duplexing (FDD), time division duplexing (TFF), or a mix of FDD and TDD carries with locations in one or multiple frequency bands. In this example, the UE 110 provides to the base stations 121 and 123 respective indications (e.g., UE capabilities) that the UE 110 is capable of implementing 4×4 MIMO reception. Based on the indications, the base stations 121 and 123 each transmit four separate downlink channels 611-614 (PCC channels 1-4) and downlink channels 621-624 (SCC channels 1-4) of signaling and/or information to the UE 110. In this example, the UE 110 receives first PCC downlink channel 611 (e.g., PCC channel 1) via antenna 202-1 and receiver path 311, second PCC downlink channel 612 (e.g., PCC channel 2) via antenna 202-2 and receiver path 312, and third PCC downlink channel 613 (e.g., PCC channel 3) via antenna 202-3 and receiver path 313. With respect to the SCC, the UE 110 receives first SCC downlink channel 621 (e.g., SCC channel 1) via antenna 202-5 and receiver path 321, second SCC downlink channel 622 (e.g., SCC channel 2) via antenna 202-6 and receiver path 322, and third SCC downlink channel 623 (e.g., SCC channel 3) via antenna 202-7 and receiver path 323. Because the dummy receiver paths 314 and 324, as well as antennas 202-4 and 202-8, do not correspond to a physical receiver path or chain, the UE 110 disregards or ignores the fourth PCC downlink channel 614 (e.g., PCC channel 4) and fourth SCC downlink channel 624 (e.g., SCC channel 4). In some aspects, the UE 110 reports signal quality parameters (e.g., predefined or artificial measurements) for the fourth PCC downlink channel 614 and/or fourth SCC downlink channel 624 effective to cause the base station 121 or 123 to direct or redistribute downlink data associated with a fourth downlink channel to others of the PCC or SCC downlink channels (e.g., channels 611-613 or channels 621-623). As such, the UE 110 may use the enabled third receiver paths 313 and 323 and the dummy receiver path 314 and 324 to effectively implement multi-carrier 3×3 MIMO by causing the base stations 121 and 123 to configure for and initiate downlink 4×4 MIMO. By so doing, the UE 110 may achieve improved receive performance, such as an increase of approximately fifty percent (50%) in throughput when implementing multi-carrier downlink 3×3 MIMO instead of 2×2 MIMO.

Example Methods

Example methods 700 through 900 are described with reference to FIG. 7 through FIG. 9, respectively, in accordance with one or more aspects of radio link management to enable unpaired receiver paths of user equipment. Alternately or additionally, aspects of radio link management to enable a modem or user equipment to implement MIMO or HORxD using unpaired receiver paths are described with reference to various methods. Generally, the methods 700 through 900 illustrate sets of operations (or acts) that may be performed in, but not necessarily limited to, the order or combinations in which the operations are shown herein. Further, any of one or more of the operations may be repeated, combined, reorganized, skipped, or linked to provide a wide array of additional and/or alternate methods. In portions of the following discussion, reference may be made to the environment 100 of FIG. 1, devices, information tables, components, or configurations of FIG. 2 through FIG. 6, devices or systems of FIG. 12 through FIG. 14, and/or entities detailed in FIG. 1 or other figures, reference to which is made for example only. The techniques and apparatuses described in this disclosure are not limited to an embodiment or performance by one entity or multiple entities operating on one device or those described with reference to the figures.

FIG. 7 illustrates an example method 700 for modifying configuration information of a modem to enable an unpaired receiver path in accordance with one or more aspects, including operations performed by the radio link manager (e.g., radio link manager 170 of FIG. 1). In some aspects, operations of the method 700 may be implemented by a user equipment to improve data reception throughput and/or improve network coverage through use of an additional receiver path of the user equipment.

At 702, a radio link manager of a UE modifies configuration information of a modem to add a nonexistent receiver path. Adding the nonexistent receiver path to the configuration information may include adding the nonexistent receiver path or a dummy receiver path to a set of receiver path parameters for one or more frequency bands of the modem. The receiver paths for the frequency band to which the nonexistent receiver path is added may include at least one paired set of receiver paths (e.g., first and second receiver paths) and an unpaired or odd numbered receiver path (e.g., third receiver path) for the frequency band.

At 704, the radio link manager modifies the configuration information of the modem to enable an unpaired receiver path. Modifying the configuration of the modem may include enabling an unpaired or odd numbered receiver path in the set of receiver path parameters for one or more the frequency bands of the modem. In some cases, the unpaired or odd numbered receiver path is enabled under one or more different SKU configurations for respective regions of UE operation.

Optionally at 706, the radio link manager flags the nonexistent receiver path as a dummy receiver path in the modem configuration information. The nonexistent receiver path may be flagged or indicated as one or a combination of a nonexistent receiver path, a dummy receiver path, or receiver path that does not correspond with a physical receiver path or operational receiver chain of the UE. In some cases, the nonexistent receiver path is flagged by modifying a receiver path, signal path, or SKU parameter using a non-Boolean data value (e.g., "Dummy" or "NonOp").

At 708, the radio link manager alters calibration parameters of the nonexistent receiver path. Altering the calibration parameters may include modifying the configuration information of the modem to alter calibration information associated with the nonexistent receiver path. In some cases, altering the calibration parameters is effective to cause or enable an L1 layer of a modem software stack to detect the nonexistent receiver as nonexistent or as a dummy receiver path. In various aspects, the configuration information is altered to indicate a null value as the calibration information for the nonexistent receiver path, indicate that the calibration information is not required for the nonexistent receiver path, or set the calibration information for the nonexistent receiver path with predefined values. The predefined values of the calibration information for the nonexistent receiver path may include one or more minimal gain settings for one or more respective dynamic range parameters.

At 710, the radio link manager exposes the nonexistent receiver path and the enabled unpaired receiver path for use by the modem in multi-channel receive modes. This may include updating the modem configuration information for one or more frequency bands such that the modem is able to select and configure at least the unpaired or odd numbered receiver path for use in the multi-channel receive modes. In some cases, the radio link manager exposes, in addition to at least one set of paired receiver paths, the nonexistent receiver path and the unpaired receiver path in a set of receiver path parameters for use by the modem for one or more frequency bands and/or regional SKUs.

Optionally at 712, the UE receives a MIMO downlink from a base station with the unpaired receiver. The UE also receives other MIMO downlinks with at least one set of paired receiver paths, such as with two or four other functional receiver paths of the UE. With the unpaired receiver path, the UE may effectively implement 3×3 MIMO or 5×5 MIMO reception as described throughout the disclosure to increase data throughput of the UE.

Optionally at 714, the UE implements HORxD with the unpaired receiver to receive a downlink from a base station. The UE receives multiple channels of a downlink signal transmission from the base station in the frequency band with the unpaired receiver (e.g., third receiver) and at least one set of paired receiver paths of the UE. By so doing, the UE may implement high order receive diversity with an odd number of receiver paths as described herein, which may include disregarding the nonexistent or dummy receiver path.

FIG. 8 illustrates an example method 800 for managing radio links to enable use of an unpaired receiver path in receiving multi-channel downlink communications from a base station, including operations performed by the radio link manager (e.g., radio link manager 170 of FIG. 1). In some aspects, operations of the method 800 may be implemented by a user equipment to increase data reception throughput of downlink MIMO communications of one or more base stations.

At 802, a radio link manager of a UE generates UE capabilities based on modem configuration information that includes parameters for an enabled unpaired receiver path and a nonexistent receiver path. The modem configuration information may indicate a frequency band or a regional SKU for which the unpaired receiver path is enabled, and the nonexistent receiver path is present. In some cases, the nonexistent receiver path is flagged in the modem configuration information as a non-functional receiver path, a dummy receiver path, or receiver path that does not correspond with a physical receiver path of the modem.

At 804, the radio link manager transmits the UE capabilities to a base station. This may be effective to cause the base station to enable a multi-channel downlink communication mode to communicate with the UE via multiple channels that correspond to at least the unpaired and nonexistent receiver paths. The base station may implement the multi-channel downlink communication mode using one or more of the frequency bands for which the unpaired receiver path and the nonexistent receiver path are indicated as enabled or available. In some cases, the UE capabilities transmitted to the base station indicate that the UE is capable of implementing a MIMO receive configuration with an even number of receiver paths, which include the unpaired and dummy receiver paths. Alternatively or additionally, the MIMO receive configuration can include a single carrier MIMO configuration to receive downlink transmissions from one base station or a multi-carrier MIMO configuration to receive downlink transmissions from multiple respective base stations.

At 806, the radio link manager reports channel signal quality parameters for the channel that corresponds to the nonexistent receiver path of the UE. The radio link manager can report artificial, altered, or preconfigured signal quality parameters to the base station or wireless network. This may be effective to cause the base station to direct or distribute downlink data to others of the multiple channels. The reported signal quality parameter can include one or more of a received signal strength, received signal quality, reference signal receive power (RSRP), reference signal receive quality (RSRQ), carrier-to-interference ratio, signal-to-noise ratio, bit-error rate, or packet-error rate.

The preconfigured signal quality parameters may indicate a minimum level of channel signal quality, which may cause a base station to redirect downlink data traffic to other channels associated with operational receiver chains. In some cases, the channel signal quality report may cause the base station to effectively fall back or drop a channel of the downlink MIMO to implement an odd number of downlinks with the operational receiver paths of the UE that include the unpaired receiver path. The reporting of the channel signal quality parameters may include reporting a predefined channel signal quality parameter that indicates a minimum value for the signal quality parameter or reporting artificial channel signal quality parameters configured for the nonexistent receiver path. In some aspects, the radio link manager reports the signal quality parameters for the channel in response to the nonexistent receiver path being flagged as a dummy receiver path in the modem configuration information.

At 808, the UE receives, from the base station, data on the others of the multiple channels that correspond to paired receiver paths and the unpaired receiver path of the UE. The data may be received from one base station via a single carrier MIMO, such as described with reference to FIG. 5, or from multiple base stations via multi-carrier MIMO, such as described with reference to FIG. 6. In some aspects, the radio link manager and/or the UE is able to implement MIMO through an odd number of channels by receiving data with an unpaired receiver path of the UE. By so doing, the UE can achieve higher throughput when receiving data from one or more base stations.

FIG. 9 illustrates an example method 900 for implementing multi-channel receive diversity with an unpaired receiver path in accordance with one or more aspects, including operations performed by the radio link manager (e.g., radio link manager 170 of FIG. 1). In some aspects, operations of the method 900 are performed by a user equipment to implement HORxD for downlink signals transmitted by a base station.

At 902, a radio link manager of a UE configures a modem for multi-channel receive diversity based on modem configuration information that includes parameters for a nonexistent receiver path and an unpaired receiver path of the UE. In some aspects, the nonexistent receiver path is flagged in the modem configuration information as a nonexistent receiver path, a dummy receiver path, or receiver path that does not correspond with a physical receiver path of the modem.

At 904, the UE receives a signal transmitted by a base station via the unpaired receiver path and other paired receiver paths of the UE. For example, the modem may receive the signal using a pair of receiver paths (e.g., first and second receiver paths 311 and 312 of FIG. 3) and a third receiver path (e.g., third receiver path 313 of FIG. 3) that is enabled along with a dummy receiver path (e.g., fourth (dummy) receiver path 314 of FIG. 3). The signal is received in a frequency band for which the unpaired receiver path is enabled in the modem configuration information.

Optionally at 906, the radio link manager omits the nonexistent receiver path from signal receive operations of the modem. For example, the radio link manager can omit the nonexistent receiver path from combining or other receive signal processing operations of the modem. Because the nonexistent receiver path does not correspond to a physical receiver path, the UE can disregard or ignore this dummy receiver path when implementing receive diversity.

At 908, the UE combines, for the signal received, respective information from the unpaired receiver path and the other paired receiver paths of the UE. As noted, the UE or modem can disregard or ignore the dummy receiver path when combining information (e.g., I/Q samples) from the other receiver paths. At 910, the UE decodes the signal received based on the combined information from the unpaired receiver path and the other paired receiver paths of the UE. The UE may combine and decode the signal received from the base station by implementing HORxD with the unpaired receiver path and the other paired receiver paths of the UE. In some aspects, the modem implements a Maximal Ratio Combining (MRC) algorithm as part of the combining or decoding of the signal received from the base station. Through MRC the use of the unpaired receiver path (e.g., third receiver path) can improve SNR receive performance by approximately 1.6 dB, which translates to about twenty percent (20%) greater linear network coverage for the UE.

By way of example, consider FIG. 10, which depicts example graphs of improved signal-to-noise performance and network performance of a user equipment using an unpaired receiver path in accordance with the described aspects. FIG. 10 depicts, at 1000, both theoretical and simulated channel quality SNR improvements that can be achieved through HORxD performed with an unpaired or odd numbered receiver path. In this example, with three receiver paths (e.g., receiver paths 311-313 of FIG. 3), the UE's SNR improves by about 1.6 dB relative to two receiver paths, which translates to about twenty percent (20%) more network coverage in terms of linear distance from base stations of the network.

FIG. 10 also depicts, at 1050, an example of downlink reception improvement as provided by 3×3 MIMO with an unpaired receiver path over 2×2 MIMO with only two paired receiver paths. The example graph at 1050 is representative of a NR 5G physical downlink shared control channel (PDSCH) simulation model in a cluster fading channel. The selected modulation and coding rate approximate a typical channel condition in which 64 QAM is utilized with a one-half (½) coding rate. The PDSCH throughputs shown illustrate a comparison between respective throughputs achieved with 4×4 MIMO, 3×3 MIMO, and 2×2 MIMO. The 3×3 MIMO modeled throughput is based on the 4×4 MIMO model, with a fourth receiver chain being configured as a dummy chain 40 dB loss added into the fourth PDSCH downlink channel. As shown in the example PDSCH simulation, the use of a third receiver path by the radio link manager to implement 3×3 MIMO enables the UE to achieve a level of throughput that is very similar to that provided by 4×4 MIMO under non-ideal SNR ranges (e.g., below 13 dB). Note that the UE also achieves over fifty percent (50%) more throughput than 2×2 MIMO in those same SNR ranges. For higher SNR ranges, 3×3 MIMO provides less throughput than 4×4 MIMO, yet still outperforms 2×2 MIMO by approximately fifteen percent.

Additionally, consider FIG. 11, which depicts an example graph of improved bit-error rate of a user equipment using an unpaired receiver path in accordance with the described aspects. FIG. 11 depicts, at 1100, a bit-error rate percentage (BER %) waterfall curve under the same simulation model described with reference to 1050 of FIG. 10. By way of review, the BER % is inversely related to network coverage. In other words, having a lower BER % translates to the UE having better network coverage and/or experiencing better network conditions. As shown at 1100, these waterfall curves demonstrate that 3×3 MIMO implemented with an unpaired or third receiver chain provides superior network coverage (e.g., lower BER %) over 2×2 MIMO, which correlates to the graphs shown in FIG. 10.

Example Devices and Systems

Figure 12:
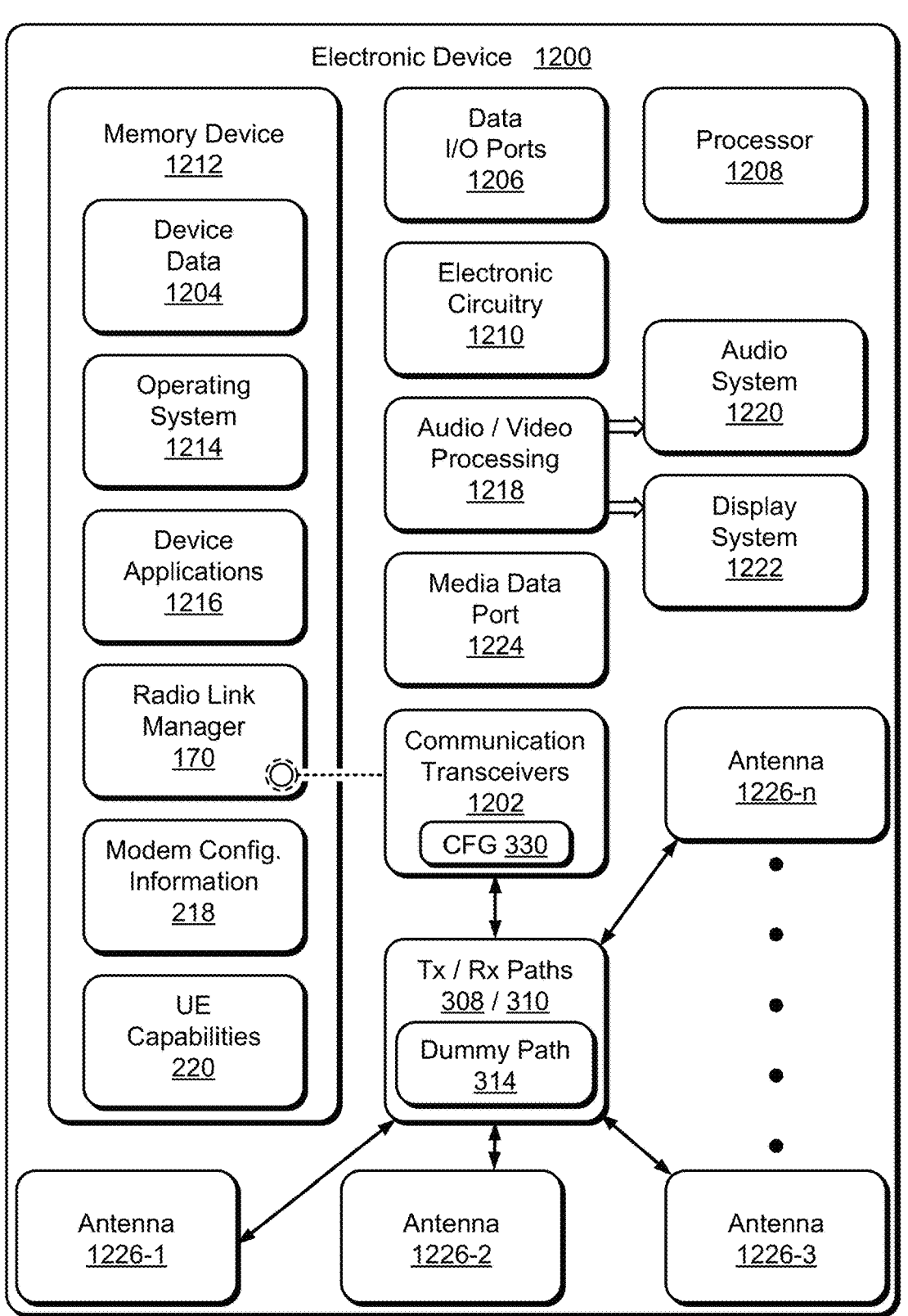
FIG. 12 illustrates an example electronic device that may implement techniques of radio link management to enable unpaired receiver paths.
Figure 13:
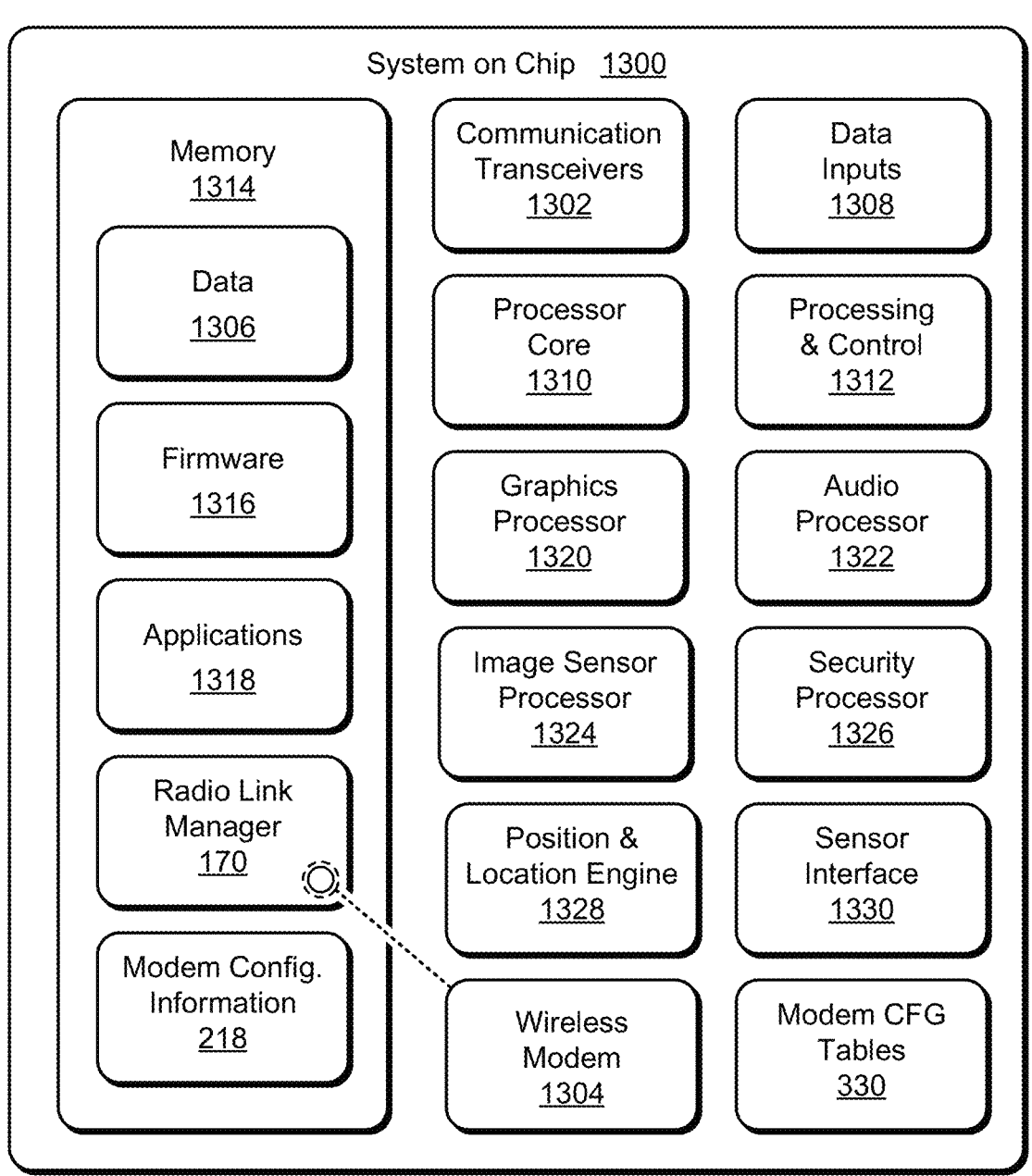
FIG. 13 illustrates an example system-on-chip (SoC) environment in which techniques of radio link management to enable unpaired receiver paths may be implemented.
Figure 14:
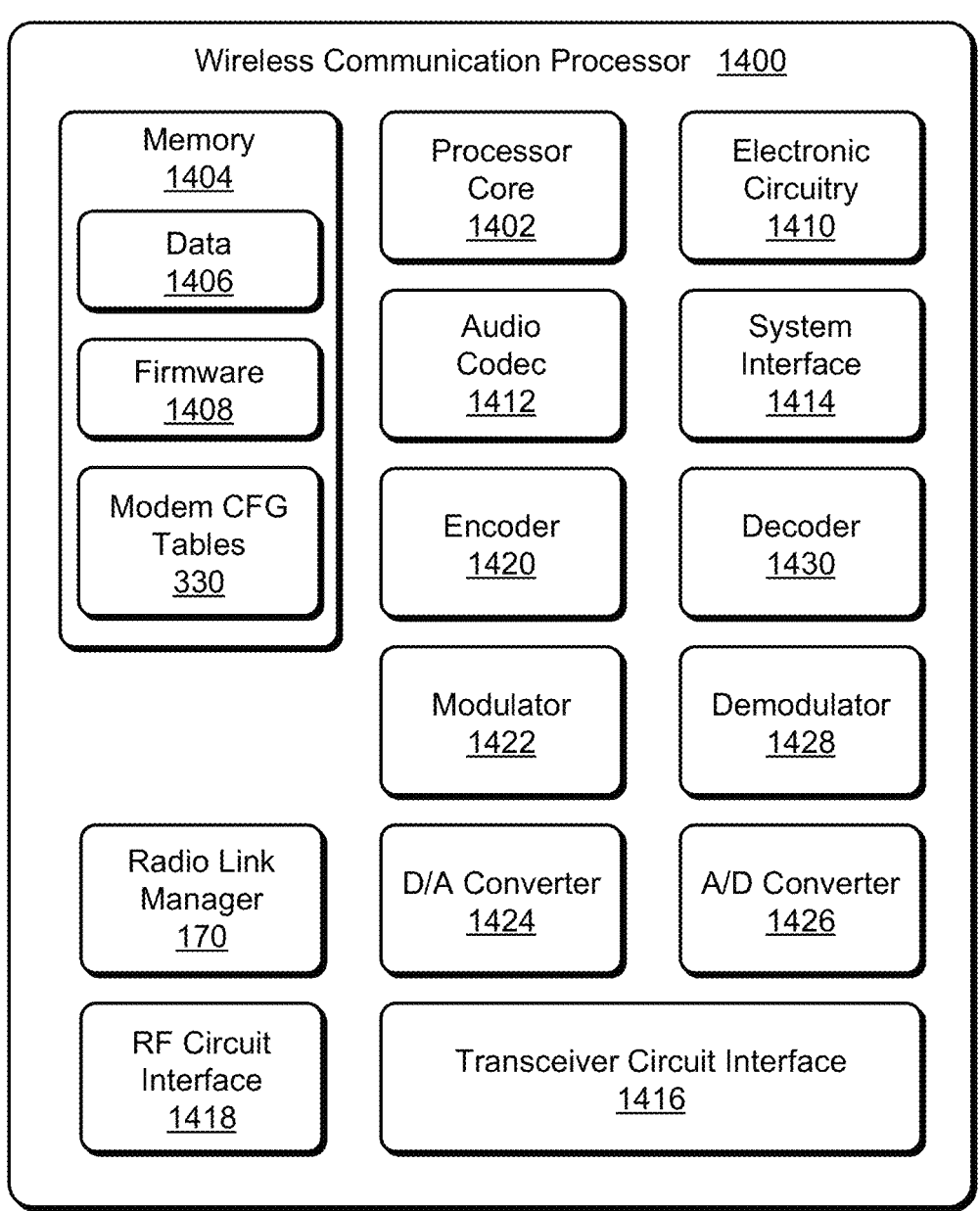
FIG. 14 illustrates an example configuration of a wireless communication processor that may implement various aspects of radio link management to enable use of unpaired receiver paths.

FIGS. 12-14 illustrate examples of a device, system-on-chip, and wireless communication processor that can implement various aspects of radio link management to enable unpaired receiver paths of user equipment. These entities, either alone or in combination, may implement one or more aspects of radio link management described with reference to the preceding FIGS. 1-11. The device, system-on-chip, and wireless communication processor may be implemented with any suitable combination of components or elements and may include other components shown or described with reference to any of the other FIGS. 1-14.

FIG. 12 illustrates various components of an example electronic device 1200 that can implement radio link management to enable use of unpaired receiver paths in accordance with one or more aspects described herein. The electronic device 1200 may be implemented as any one or a combination of a fixed or mobile device, in any form of a consumer device, computing device, portable device, user device, user equipment, server, communication device, phone, navigation device, gaming device, media device, messaging device, media player, and/or other type of electronic device or a wirelessly-enabled device. For example, the electronic device 1200 may be implemented as a smartphone, phone-tablet (phablet), laptop computer, set-top box, wireless drone, computing-glasses, vehicle-based computing system, or wireless broadband router.

The electronic device 1200 includes communication transceivers 1202 that enable wired and/or wireless communication of device data 1204, such as received data, transmitted data, or other information as described above. Example communication transceivers 1202 include NFC transceivers, WPAN radios compliant with various IEEE 802.15 standards, WLAN radios compliant with any of the various IEEE 802.11 standards, WWAN (3GPP-compliant) radios, LTE transceivers, 5G NR transceivers, wireless metropolitan area network (WMAN) radios compliant with various IEEE 802.16 standards, and wired local area network (LAN) Ethernet transceivers. In some aspects, multiple communication transceivers 1202 or components thereof are operably coupled with respective instances of transmitter paths 308 and receiver paths 310 embodied on the electronic device 1200. The transmitter paths 308 and receiver paths 310 may be implemented similar to the transmitter paths 308 and receiver paths 310 (e.g., unpaired receiver paths, dummy receiver paths) as described with reference to FIGS. 1-11. In this example, the receiver paths 310 include an instance of a dummy receiver path 314, which may be used to enable unpaired receiver paths of the electronic device 1200.

The electronic device 1200 may also include one or more data input/output ports 1206 (data I/O ports 1206) via which any type of data, media content, and/or other inputs can be received, such as user-selectable inputs, messages, applications, music, television content, recorded video content, and any other type of audio, video, and/or image data received from any content and/or data source. The data I/O ports 1206 may include USB ports, coaxial cable ports, and other serial or parallel connectors (including internal connectors) for flash memory, DVDs, CDs, and the like. These data I/O ports 1206 may be used to couple the electronic device to components, peripherals, or accessories such as keyboards, microphones, or cameras.

The electronic device 1200 of this example includes at least one processor 1208 (e.g., one or more application processors, processor cores microprocessors, digital signal processors (DSPs), controllers, or the like), which can include a combined processor and memory system, that executes computer-executable instructions stored on computer-readable media to control operations or implement functionalities of the device. Generally, a processor or processing system may be implemented at least partially in hardware, which can include components of an integrated circuit or on-chip system, a DSP, an application-specific integrated circuit (ASIC), a field-programmable gate array (FPGA), a complex programmable logic device (CPLD), and other implementations in silicon and/or other hardware. Alternatively or additionally, the electronic device 1200 can be implemented with any one or combination of electronic circuitry 1210, which may include hardware, fixed logic circuitry, or physical interconnects (e.g., traces or connectors) that are implemented in connection with processing and control circuits. This electronic circuitry 1210 can implement executable or hardware-based modules (not shown) through logic circuitry and/or hardware, such as an FPGA or CPLD. Although not shown, the electronic device 1200 may also include a system bus, interconnect fabric, crossbar, or data transfer system that couples the various components within the device. A system bus or interconnect fabric can include any one or combination of different bus structures or IP blocks, such as a memory bus, memory controller, a peripheral bus, a universal serial bus, interconnect nodes, and/or a processor or local bus that utilizes any of a variety of bus architectures.

The electronic device 1200 also includes one or more memory devices 1212 that enable data storage, examples of which include RAM, SRAM, DRAM, NVRAM, ROM, flash memory, EPROM, EEPROM, and a disk storage device. Any or all of the memory devices 1212 may enable persistent and/or non-transitory storage of information, data, or code, and thus do not include transitory signals or carrier waves in the general context of this disclosure. For example, the memory device(s) 1212 provide data storage mechanisms to store the device data 1204 and other types of data (e.g., user data). The memory device 1212 may also store an operating system 1214, firmware, and/or device applications 1216 of the electronic device as instructions, code, or information. These instructions or code can be executed by the processor 1208 to implement various functionalities of the electronic device, such as to provide a user interface, enable data access, or manage connectivity with a wireless network.

In this example, the memory device 1212 also stores processor-executable code or instructions for providing an instance of a radio link manager 170, which may be implemented similar to or differently from the radio link manager described with reference to FIGS. 1-11. The memory devices also include instances of modem configuration information 218 and UE capabilities 220 with which the radio link manager 170 may interact to enable unpaired receiver paths or add dummy receiver paths for the communication transceivers 1202. In various aspects, the radio link manager 170 loads modified modem configuration information 218 into the communication transceivers 1202 to add dummy receiver paths or enable unpaired receiver paths for multi-channel receive modes.

As shown in FIG. 12, the electronic device 1200 may include an audio and/or video processing system 1218 for processing audio data and/or passing through the audio and video data to an audio system 1220 and/or to a display system 1222 (e.g., a video buffer or device screen). The audio system 1220 and/or the display system 1222 may include any devices that process, display, and/or otherwise render audio, video, graphical, and/or image data. Display data and audio signals can be communicated to an audio component and/or to a display component via an RF link, S-video link, HDMI (high-definition multimedia interface), Display Port, composite video link, component video link, DVI (digital video interface), analog audio connection, or other similar communication link, such as a media data port 1224. In some implementations, the audio system 1220 and/or the display system 1222 are external or separate components of the electronic device 1200. Alternately, the display system 1222 can be an integrated component of the example electronic device 1200, such as part of an integrated display with a touch interface.

The electronic device 1200 also includes antennas 1226-1, 1226-2, through 1226-n, where n may be any suitable number of antennas. The antennas 1226-1 through 1226-n are coupled, via an RF front end (not shown), to transmitter paths 308 and receiver paths 310 of the electronic device 1200, which may include any suitable combination of components to facilitate transmission or reception of signals by the communication transceivers 1202 through of the antennas 1226-1 through 1226-n. In some aspects, each of the antennas 1226-1 through 1226-n correspond to a respective pair of a transmitter path 308 and a receiver path 310 of the electronic device. Generally, the radio link manager 170 may interact with any of the modem configuration information 218, UE capabilities 220, communication transceivers 1202, receiver paths 310, and/or antennas 1226-1 through 1226-n to implement radio link management to enable unpaired receiver paths of user equipment as described herein. Alternatively or additionally, the electronic device 1200 may represent an example implementation of the user equipment 110 as described throughout the present disclosure. Thus, in some cases the processor 1208 is an example of the processor 212 (not shown) and/or the memory device 1212 is an example of the computer-readable storage media 214 (not shown) for storing various data, instructions, or code for implementing a radio link manager or other applications. As such, aspects of radio link management to enable unpaired receiver paths of user equipment as described herein can be implemented by, or in conjunction with, the electronic device 1200 of FIG. 12.

FIG. 13 illustrates an example system-on-chip (SoC) that may implement aspects of radio link management to enable unpaired receiver paths of user equipment. The SoC 1300 may be embodied as or within any type of user equipment 110, user equipment, apparatus, other device, or system as described with reference to FIGS. 1-11 to implement radio link management to enable unpaired receiver paths of user equipment. Although described with reference to chip-based packaging, the components shown in FIG. 13 may also be embodied as other systems or component configurations, such as, and without limitation, a Field-Programmable Gate Arrays (FPGA), an Application-Specific Integrated Circuits (ASIC), an Application-Specific Standard Products (ASSP), a digital signal processor (DSP), Complex Programmable Logic Devices (CPLD), system in package (SiP), package on package (PoP), processing and communication chip set, communication co-processor, sensor co-processor, or the like.

In this example, the SoC 1300 includes communication transceivers 1302 and a wireless modem 1304 that enable wired or wireless communication of system data 1306 (e.g., received data, data that is being received, data scheduled for broadcast, packetized, or the like). In some aspects, the wireless modem 1304 is a multi-mode multi-band modem or baseband processor that is configurable to communicate in accordance with various communication protocols and/or in different frequency bands, such as those protocols or frequency bands described throughout this disclosure. The wireless modem 1304 may include a transceiver interface (not shown) for communicating encoded or modulated signals with transceiver circuitry, including transmitter chain and receiver chain circuitry (e.g., transmitter paths 308 and receiver paths 310). The wireless modem 1304 may also include or be associated with an instance of modem configuration tables 330, which are shown in FIG. 13.

The system data 1306 or other system content can include configuration settings of the system or various components, media content stored by the system, and/or information associated with a user of the system. Media content stored on the system on chip 1300 may include any type of audio, video, and/or image data. The system on chip 1300 also includes one or more data inputs 1308 via which any type of data, media content, and/or inputs can be received, such as user input, user-selectable inputs (explicit or implicit), or any other type of audio, video, and/or image data received from a content and/or data source. Alternatively or additionally, the data inputs 1308 may include various data interfaces, which can be implemented as any one or more of a serial and/or parallel interface, a wireless interface, a network interface, and as any other type of communication interface enabling communication with other devices or systems.

The system on chip 1300 includes one or more processor cores 1310, which process various computer-executable instructions to control the operation of the system on chip 1300 and to enable techniques for radio link management for enabling unpaired receiver paths of user equipment. Alternatively or additionally, the system on chip 1300 can be implemented with any one or a combination of hardware, firmware, or fixed logic circuitry that is implemented in connection with processing and control circuits, which are generally shown at 1312. Although not shown, the system on chip 1300 may also include a bus, interconnect, crossbar, or fabric that couples the various components within the system.

The system on chip 1300 also includes a memory 1314 (e.g., computer-readable media), such as one or more memory circuits that enable persistent and/or non-transitory data storage, and thus do not include transitory signals or carrier waves. Examples of the memory 1314 include RAM, SRAM, DRAM, NVRAM, ROM, EPROM, EEPROM, or flash memory. The memory 1314 provides data storage for the system data 1306, as well as for firmware 1316, applications 1318, and any other types of information and/or data related to operational aspects of the system on chip 1300. For example, the firmware 1316 can be maintained as processor-executable instructions of an operating system (e.g., real-time OS) within the memory 1314 and executed on one or more of the processor cores 1310.

The applications 1318 may include a system manager, such as any form of a control application, software application, signal processing and control module, code that is native to a particular system, an abstraction module or gesture module and so on. The memory 1314 may also store system components or utilities for implementing aspects of radio link management to enable unpaired receiver paths, such as a radio link manager 170 and modem configuration information 218. These entities may be embodied as combined or separate components, examples of which are described with reference to corresponding entities or functionality as illustrated in FIGS. 1-12 or FIG. 14. In some aspects, the radio link manager 170 interacts with the modem configuration information 218, modem configuration tables 330, and the wireless modem 1304 to implement aspects of enabling unpaired receiver paths. Although shown in memory 1314, one or more elements of the radio link manager 170 may be implemented, in whole or in part, through hardware or firmware.

In some aspects, the system-on-chip 1300 also includes additional processors or co-processors to enable other functionalities, such as a graphics processor 1320, audio processor 1322, and image sensor processor 1324. The graphics processor 1320 may render graphical content associated with a user interface, operating system, or applications of the system-on-chip 1300. In some cases, the audio processor 1322 encodes or decodes audio data and signals, such as audio signals and information associated with voice calls or encoded audio data for playback. The image sensor processor 1324 may be coupled to an image sensor and provide image data processing, video capture, and other visual media conditioning and processing functions.

The system-on-chip 1300 may also include a security processor 1326 to support various security, encryption, and cryptographic operations, such as to provide secure communication protocols and encrypted data storage. Although not shown, the security processor 1326 may include one or more cryptographic engines, cipher libraries, hashing modules, or random number generators to support encryption and cryptographic processing of information or communications of the system-on-chip 1300. Alternatively or additionally, the system-on-chip 1300 can include a position and location engine 1328 and a sensor interface 1330. Generally, the position and location engine 1328 may provide positioning or location data by processing signals of a Global Navigation Satellite System (GNSS) and/or other motion or inertia sensor data (e.g., dead-reckoning navigation). The sensor interface 1330 enables the system-on-chip 1300 to receive data from various sensors, such as capacitance and motion sensors. In some aspects, the radio link manager 170 may interact with any of the processor or co-processor of the system-on-chip 1300 to enable radio link management to enable unpaired receiver paths.

FIG. 14 illustrates an example configuration of a wireless communication processor 1400 (communication processor 1400) that may implement various aspects of radio link management to enable use of unpaired receiver paths. Although referred to generally as a communication processor, the communication processor 1400 may be implemented as a modem baseband processor, software defined radio module, configurable modem (e.g., multi-mode, multi-band modem), wireless data interface, or wireless modem, such as the wireless modem 1304 of the system-on-chip 1300. The wireless communication processor 1400 may be implemented in a device or system to support data access, messaging, or data-based services of a wireless network, as well as various audio-based communication (e.g., voice calls).

In this example, the wireless communication processor 1400 includes at least one processor core 1402 and a memory 1404, which is implemented as hardware-based memory that enables persistent and/or non-transitory data storage, and thus does not include transitory signals or carrier waves. The processor core 1402 may be configured as any suitable type of processor core, microcontroller, digital signal processor core, or the like. The memory 1404 may include any suitable type of memory device or circuit, such as RAM, DRAM, SRAM, NVRAM, ROM, flash memory, or the like. Generally, the memory stores data 1406 of the communication processor 1400, as well as firmware 1408 and other applications. The processor core 1402 may execute processor-executable instructions of the firmware 1408 or applications to implement functions of the communication processor 1400, such as signal processing and data encoding operations. The memory 1404 may also store data and information useful to implement aspects of radio link management to enable unpaired receiver paths. In some aspects, the memory 1404 of the communication processor 1400 includes modem configuration tables 330 or other modem configuration information 218 (not shown), which may be implemented in combination or separately as shown in FIG. 14.

The communication processor 1400 may also include electronic circuitry 1410 for managing or coordinating operations of various components and an audio codec 1412 for processing audio signals and data. The electronic circuitry 1410 may include hardware, fixed logic circuitry, or physical interconnects (e.g., traces or connectors) that are implemented in connection with processing and control circuits of the communication processor and various components. The audio codec 1412 may include a combination of logic, circuitry, or firmware (e.g., algorithms) to support encoding and/or decoding of audio information and audio signals, such as analog signals and digital data associated with voice or sound functions of the communication processor 1400.

A system interface 1414 of the communication processor 1400 enables communication with a host system or application processor. For example, the communication processor 1400 may provide or expose data access functionalities to the system or application processor through the system interface 1414. In this example, the communication processor also includes a transceiver circuit interface 1416 and an RF circuit interface 1418, through which the communication processor 1400 may manage or control respective functionalities of a transceiver circuit (e.g., transmit and receive chain circuitry) or RF front end to implement various communication protocols and techniques. In various aspects, the communication processor includes digital signal processing or signal processing blocks for encoding and modulating data for transmission or demodulating and decoding received data.

In this example, the communication processor 1400 includes an encoder 1420, modulator 1422, and digital-to-analog converter 1424 (D/A converter 1424) for encoding, modulating, and converting data sent to the transceiver circuit interface. The communication processor also includes an analog-to-digital converter 1426 (A/D converter 1426), a demodulator 1428, and a decoder 1430 for converting, demodulating, and decoding data received from the transceiver circuit interface 1416. In some aspects, these signal processing blocks and components are implemented as respective transmit and receive paths (e.g., transmitter paths 308 and receiver paths 310) of the communication processor 1400, which may be configurable for different radio access technologies or frequency bands.

The wireless communication processor 1400 also includes a radio link manager 170, which may be embodied as separately or combined with other components, examples of which are described with reference to corresponding entities or functionality as illustrated in FIGS. 1-13. In aspects, the radio link manager 170 interacts with the modem configuration tables 330 and other components of the wireless communication processor 1400 to implement radio link management to enable unpaired receiver paths. For example, the radio link manager 170 may add dummy receiver paths for the transceiver circuit interface 1416 and/or RF circuit interface and enable one or more unpaired receiver paths for respective frequency bands or regional SKUs in the modem configuration tables 330. The wireless communication processor 1400 may then use the enabled receiver paths to implement multi-channel or multi-carrier receive modes when receiving downlinks from one or more base stations. Alternatively or additionally, the radio link manager 170 may cause or direct the wireless communication processor 1400 to implement any of the aspects of radio link management as described with reference to FIGS. 1-13.

Further to the descriptions above, a user may be provided with controls allowing the user to make an election as to both if and when devices, systems, applications, and/or features described herein may enable collection of user information, such as one or more of radio link metrics (wireless link metrics), connection duration information, average connection length, signal quality/strength information, network identity information, network basic service set identifier (BSSID) information, mobile network subscriber information, recently utilized wireless communication bands/channels, a user's preferences, a user's current location, if the user has communicated content or information with a server, or the like.

In addition, certain data may be treated in one or more ways before it is stored or used, so that personally identifiable information is removed. For example, a user's identity may be treated so that no personally identifiable information can be determined for the user. For example, a user's geographic location may be generalized or randomized about where location information is obtained (such as to a city, postal code, or state/province level), so that a particular location of a user cannot be determined. Thus, the user may have control(s) over what information is collected about the user, one or more devices of the user, how that information is used, and/or what information is provided to the user.

Variations

Although the above-described apparatuses and techniques are described in the context of radio link management to enable unpaired receiver paths in a wireless network in which one or more base stations are accessible, the described user equipment, devices, systems, and methods are non-limiting and may apply to other contexts, user equipment deployments, or wireless communication environments.

Generally, the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or in addition, any of the functionality described herein can be performed, at least in part, by one or more hardware logic components, such as, and without limitation, FPGAs, ASICs, ASSPs, SoCs, CPLDs, co-processors, context hubs, sensor co-processors, or the like.

A first method performed by a user equipment to enable an unpaired receiver path of the user equipment (UE) comprises modifying configuration information of a modem of the UE to add a nonexistent receiver path to a set of receiver path parameters for a frequency band of the modem; modifying the configuration of the modem of the UE to enable an unpaired receiver path in the set of receiver path parameters for the frequency band of the modem; and exposing, in addition to at least one set of paired receiver paths, the nonexistent receiver path (e.g., dummy receiver path) and the unpaired receiver path in the set of receiver path parameters for use by the modem in a multi-channel receive mode for the frequency band.

In addition to the above described first method, a second method performed by a user equipment to perform multi-channel receiving with an unpaired receiver path of the user equipment (UE) comprises generating user equipment capabilities, UE capabilities, based on modem configuration information for a frequency band that includes parameters that indicate the unpaired receiver path as enabled and parameters for a nonexistent receiver path; transmitting the UE capabilities to a base station effective to cause the base station to enable a multi-channel downlink communication mode to communicate with the UE in the frequency band via multiple channels that correspond to at least the unpaired receiver path that is enabled and the nonexistent receiver path; reporting channel signal quality parameters for the one of the multiple channels that corresponds to the nonexistent receiver path of the UE effective to cause the base station to direct at least a portion of downlink data from the channel that corresponds to the nonexistent receiver path to others of the multiple channels; and receiving, from the base station and in the frequency band, the downlink data on the others of the multiple channels that correspond to paired receiver paths of the UE and the unpaired receiver path of the UE.

In addition to the above described methods, a third method performed by a user equipment to implement diversity reception with an unpaired receiver path of the user equipment (UE) comprises configuring a modem for multi-channel receive diversity based on modem configuration information for a frequency band that includes parameters for a nonexistent receiver path and the unpaired receiver path of the UE; receiving, in the frequency band, a signal transmitted by a base station via the unpaired receiver path and other paired receiver paths of the UE; combining, for the signal received, respective information from the unpaired receiver and the other paired receiver paths of the UE to provided combined information for the signal received; and decoding the signal received from the base station based on the combined information provided by the unpaired receiver path and the other paired receiver paths of the UE.

In addition to any of the methods described above, modifying the set of receiver path parameters for the nonexistent receiver path to flag the nonexistent receiver path of the modem as a nonexistent receiver path, a dummy receiver path, or receiver path that does not correspond with a physical receiver path.

In addition to any of the methods described above or below, modifying the set of receiver path parameters for the nonexistent receiver path to flag the nonexistent receiver path includes using a non-Boolean data value to flag the nonexistent receiver path; and modifying the configuration of the modem of the UE to enable the unpaired receiver path in the set of receiver path parameters includes setting a Boolean data value In addition to any of the methods described above or below, modifying the configuration information of the modem to alter calibration information associated with the nonexistent receiver path.

In addition to any of the methods described above or below, wherein modifying the configuration information of the modem to alter calibration information associated with the nonexistent receiver path includes one of: modifying the configuration information to indicate a null value as the calibration information for the nonexistent receiver path; modifying the configuration information to indicate that the calibration information is not required for the nonexistent receiver path; or modifying the configuration information to set the calibration information for the nonexistent receiver path with predefined values.

In addition to any of the methods described above or below, the predefined values of the calibration information for the nonexistent receiver path include one or more minimal gain settings for one or more respective dynamic range parameters.

In addition to any of the methods described above or below, wherein modifying the configuration information of the modem to alter calibration information associated with the nonexistent receiver path is effective to cause an L1 layer of modem software to detect the nonexistent receiver as nonexistent.

In addition to any of the methods described above or below, receiving multiple channels of a multiple-input multiple output, MIMO, downlink transmission from a base station in the frequency band with the at least one set of paired receiver paths and the unpaired receiver path of the modem.

In addition to any of the methods described above or below, receiving multiple channels of a downlink signal transmission from a base station in the frequency band with the at least one set of paired receiver paths and the unpaired receiver path of the modem to implement high order receive diversity.

In addition to any of the methods described above or below, the at least one set of paired receiver paths includes an even number of receiver paths for the frequency band of the modem; the unpaired receiver path is an odd numbered receiver path for the frequency band; and a sum of the paired receiver paths, the unpaired receiver path, and the nonexistent receiver path result includes an even number of total receiver paths of the modem for the frequency band.

In addition to any of the methods described above or below, reporting the channel signal quality parameters includes using one of: predefined channel signal quality parameters that indicate a minimum value for one or more of the channel signal quality parameters; or artificial channel signal quality parameters configured for nonexistent receiver paths of the modem.

In addition to any of the methods described above or below, the nonexistent receiver path is flagged in the modem configuration information as a nonexistent receiver path, a dummy receiver path, or receiver path that does not correspond with a physical receiver path of the modem; and the reporting of the signal quality parameters for the channel that corresponds to the nonexistent receiver path is performed in response to the nonexistent receiver path being flagged in the modem configuration information.

In addition to any of the methods described above or below, the UE capabilities transmitted to the base station indicate that the UE is capable of implementing a multiple-input multiple-output, MIMO, receive configuration with an even number of receiver paths.

In addition to any of the methods described above or below, the MIMO receive configuration includes one of: a single carrier MIMO configuration to receive the downlink transmission from the base station in the frequency band; or a dual carrier MIMO configuration to: receive, via the unpaired receiver path, the downlink transmission from the base station in the frequency band; and receive, via another unpaired receiver path, another downlink transmission from another base station in a different frequency band for which the other unpaired receiver path is indicated as enabled.

In addition to any of the methods described above or below, omitting the nonexistent receiver path from the combining or other receive signal processing operations of the modem. In addition to any of the methods described above or below, the nonexistent receiver path is flagged in the modem configuration information as a nonexistent receiver path, a dummy receiver path, or receiver path that does not correspond with a physical receiver path of the modem.

In addition to any of the methods described above or below, wherein the combining and decoding is performed to implement high order receive diversity of the signal transmitted by the base station. In addition to any of the methods described above or below, implementing, via the modem, a Maximum Ratio Combining algorithm as part of the combining or decoding of the signal received from the base station.

A user equipment comprising: at least one wireless transceiver; at least one unpaired receiver path in one or more frequency bands; a processor; and computer-readable storage media comprising instructions, responsive to execution by the processor, for directing the user equipment to perform any of the methods described above.

A system-on-chip comprising: a transceiver module that includes a transmitter module and a first receiver module; an interface to multiple transmitter paths; an interface to multiple receiver paths; a memory storing modem configuration information; a processor core configured to execute processor-executable instructions; and a computer-readable storage media comprising instructions that, responsive to execution by the processor core, direct a device in which the system-on-chip is embodied to perform any of the methods described above.

A computer-readable storage media comprising instructions that, responsive to execution by a processor, cause any of the methods described above to be performed.

Although various aspects of radio link management to enable unpaired receiver paths of user equipment have been described in language specific to certain features, components, and/or methods, the subject matter of the appended claims is not necessarily limited to the specific features or methods described. Rather, the specific features and methods are disclosed as example implementations of managing modem and radio link configurations and other equivalent features or methods are intended to be within the scope of the appended claims. Further, various different aspects are described, and it is to be appreciated that each described aspect can be implemented independently or in connection with other described aspects.

What is claimed is:

1. A method to perform multi-channel receiving with an unpaired receive-only chain of a user equipment, the method comprising:

generating user equipment capabilities based on modem configuration information for a frequency band that includes first receive-only chain parameters for the unpaired receive-only chain and second receive-only chain parameters for a nonexistent receive-only chain that is not present in the user equipment, the nonexistent receive-only chain being flagged in the modem configuration information as a receiver path that does not correspond with a physical receiver path of the user equipment or a modem of the user equipment;

transmitting, via a modem of the user equipment, the user equipment capabilities to a base station effective to cause the base station to enable a multi-channel downlink communication mode to communicate with the user equipment in the frequency band via multiple channels that correspond to the unpaired receive-only chain, the nonexistent receive-only chain, and at least two paired receive-only chains of the user equipment;

reporting, in response to the nonexistent receive-only chain being flagged in the modem configuration information, a channel signal quality parameter for the one of the multiple channels that corresponds to the nonexistent receive-only chain effective to cause the base station to direct at least a portion of downlink data from the channel that corresponds to the nonexistent receive-only chain to one or more other channels of the multiple channels; and receiving, from the base station and in the frequency band, the portion of the downlink data on the one or more other channels of the multiple channels that correspond to the unpaired receive-only chain, a first receive-only chain of the at least two paired receive-only chains, or a second receiver path receive-only chain of the at least two paired receive-only chains.

2. The method as recited by claim 1, wherein reporting the channel signal quality parameter for the channel that corresponds to the nonexistent receive-only chain comprises at least one of:

using a predefined channel signal quality parameter that indicates a minimum value for the channel signal quality parameter; or using an artificial channel signal quality parameter configured for the nonexistent receive-only chain of the user equipment.

3. The method as recited by claim 1, wherein:

the nonexistent receive-only chain is flagged in the modem configuration information as a dummy receiver path or an unpopulated receiver path that does not correspond with a physical receiver path of the user equipment or the modem; and the reporting of the channel signal quality parameter for the channel that corresponds to the nonexistent receive-only chain is performed in response to the nonexistent receive-only chain being flagged in the modem configuration information.

4. The method as recited by claim 1, wherein:

the user equipment includes an odd number of receive-only chains that comprise the unpaired receive-only chain and the at least two paired receive-only chains of the user equipment; and the user equipment capabilities transmitted to the base station indicate that the user equipment is capable of implementing a multiple-input multiple-output receive configuration with an even number of receiver paths.

5. The method as recited by claim 4, wherein the multiple-input multiple-output receive configuration comprises at least one of:

a single carrier multiple-input multiple-output configuration to receive a downlink transmission from the base station in the frequency band; or a dual carrier multiple-input multiple-output configuration to:

receive, via the unpaired receive-only chain, the downlink transmission from the base station in the frequency band; and receive, via another unpaired receive-only chain, another downlink transmission from another base station in a different frequency band for which the other unpaired receive-only chain is configured to operate.

6. The method as recited claim 1, wherein:

the downlink data is received as signals transmitted by the base station, and the method further comprises:

configuring the modem of the user equipment for multi-channel receive diversity based on the modem configuration information;

combining, for the signals received, respective information from the unpaired receive-only chain and the at least two paired receive-only chains of the user equipment to provide combined information for the signals received; and decoding the downlink data from the signals based on the combined information provided by the unpaired receive-only chain and the at least two paired receive-only chains of the user equipment.

7. The method as recited by claim 6, wherein the nonexistent receive-only chain is omitted from:

the combining of the respective information; or another receive signal processing operation implemented by the modem.

8. The method as recited by claim 6, wherein the combining of the respective information and the decoding of the downlink data is performed to implement high order receive diversity of the signals received from the base station.

9. The method as recited by claim 6, further comprising implementing, via the modem, a Maximum Ratio Combining algorithm as part of the combining of the respective information and the decoding of the downlink data from the signals received from the base station.

10. The method as recited by claim 1, further comprising:

modifying the modem configuration information of the modem to add the nonexistent receive-only chain to a set of receiver path parameters for the frequency band of the modem; or modifying the modem configuration information of the modem to alter calibration information associated with the nonexistent receive-only chain of the user equipment.

11. The method as recited by claim 10, wherein modifying the modem configuration information of the modem to alter calibration information associated with the nonexistent receive-only chain further comprises at least one of:

modifying the modem configuration information to indicate a null value as the calibration information for the nonexistent receive-only chain;

modifying the modem configuration information to indicate that the calibration information is not required for the nonexistent receive-only chain; or modifying the modem configuration information to set the calibration information for the nonexistent receive-only chain using predefined values.

12. A user equipment comprising:

at least one wireless transceiver;

a modem configured to enable wireless communication;

an unpaired receive-only chain operably coupled to the modem and configurable to operate in one or more frequency bands; and a radio link manager configured to:

generate user equipment capabilities based on modem configuration information for a frequency band that includes first receive-only chain parameters for the unpaired receive-only chain and second receive-only chain parameters for a nonexistent receive-only chain that is not present in the user equipment, the nonexistent receive-only chain being flagged in the modem configuration information as a dummy receiver path that does not correspond with a physical receiver path of the user equipment or the modem;

transmit, via the modem of the user equipment, the user equipment capabilities to a base station effective to cause the base station to enable a multi-channel downlink communication mode to communicate with the user equipment in the frequency band via multiple channels that correspond to the unpaired receive-only chain, the nonexistent receive-only chain, and at least two paired receive-only chains of the user equipment;

report a channel signal quality parameter for the one of the multiple channels that corresponds to the nonexistent receive-only chain effective to cause the base station to direct at least a portion of downlink data from the channel that corresponds to the nonexistent receive-only chain to one or more other channels of the multiple channels; and receive, from the base station and in the frequency band, the portion of the downlink data on the one or more other channels of the multiple channels that correspond to the unpaired receive-only chain, a first receive-only chain of the at least two paired receive-only chains, or a second receive-only chain of the at least two paired receive-only chains.

13. The user equipment as recited by claim 12, wherein to report the channel signal quality parameter for the channel that corresponds to the nonexistent receive-only chain, the radio link manager is further configured to:

report a predefined channel signal quality parameter that indicates a minimum value for the channel signal quality parameter; or report an artificial channel signal quality parameter configured for the nonexistent receive-only chain of the user equipment.

14. The user equipment as recited by claim 12, wherein:

the nonexistent receive-only chain is flagged in the modem configuration information as an unpopulated receiver path or a receiver path that does not correspond with a physical receiver path of the user equipment or the modem; and the radio link manager is configured to report the channel signal quality parameter for the channel that corresponds to the nonexistent receive-only chain in response to the nonexistent receive-only chain being flagged in the modem configuration information.

15. The user equipment as recited by claim 12, wherein:

the user equipment includes an odd number of receive-only chains that comprise the unpaired receive-only chain and the at least two paired receive-only chains of the user equipment; and the user equipment capabilities transmitted to the base station indicate that the user equipment is capable of implementing a multiple-input multiple-output receive configuration with an even number of receive-only chains.

16. The user equipment as recited by claim 15, wherein the multiple-input multiple-output receive configuration comprises at least one of:

a single carrier multiple-input multiple-output configuration to receive a downlink transmission from the base station in the frequency band; or a dual carrier multiple-input multiple-output configuration to:

receive, via the unpaired receive-only chain, the downlink transmission from the base station in the frequency band; and receive, via another unpaired receive-only chain, another downlink transmission from another base station in a different frequency band for which the other unpaired receive-only chain is configured to operate.

17. An apparatus comprising:

a modem configured to enable wireless communication;

a receiver comprising an unpaired receiver path operably coupled to the modem and configurable to operate in one or more frequency bands; and a radio link manager configured to:

generate user equipment capabilities based on modem configuration information for a frequency band that includes first receiver path parameters for the unpaired receiver path and second receiver path parameters for a nonexistent receiver path that is not present in the receiver, the nonexistent receiver path being flagged in the modem configuration information as a receiver path that does not correspond with a physical receiver path of the apparatus or the modem;

transmit, via the modem, the user equipment capabilities to a base station effective to cause the base station to enable a multi-channel downlink communication mode to communicate with the modem in the frequency band via multiple channels that correspond to the unpaired receiver path, the nonexistent receiver path, and at least two paired receiver paths operably coupled with the modem;

report, in response to the nonexistent receiver path being flagged in the modem configuration information, a channel signal quality parameter for the one of the multiple channels that corresponds to the nonexistent receiver path effective to cause the base station to direct at least a portion of downlink data from the channel that corresponds to the nonexistent receiver path to one or more other channels of the multiple channels; and receive, via the modem and from the base station and in the frequency band, the portion of the downlink data on the one or more other channels of the multiple channels that correspond to the unpaired receiver path, a first receiver path of the at least two paired receiver paths, or a second receiver path of the at least two paired receiver paths.

18. The apparatus as recited by claim 17, wherein to report the channel signal quality parameter for the channel that corresponds to the nonexistent receiver path, the radio link manager is further configured to:

report a predefined channel signal quality parameter that indicates a minimum value for the channel signal quality parameter; or report an artificial channel signal quality parameter configured for the nonexistent receiver path of the receiver.

19. The apparatus as recited by claim 17, wherein:

the nonexistent receiver path is flagged in the modem configuration information as a receiver path that does not correspond with a physical chain of receive-only circuitry in the modem; and the radio link manager is configured to report the channel signal quality parameter for the channel that corresponds to the nonexistent receiver path in response to the nonexistent receiver path being flagged in the modem configuration information.

20. The apparatus as recited by claim 17, wherein:
the receiver includes an odd number of receiver paths that
   comprise the unpaired receiver path and the at least two
   paired receiver paths; and
the user equipment capabilities transmitted to the base
   station indicate that the modem is capable of imple-
   menting a multiple-input multiple-output receive con-
   figuration with an even number of receiver paths.

\* \* \* \* \*